(12) United States Patent
Lasch et al.

(10) Patent No.: US 6,677,028 B1
(45) Date of Patent: Jan. 13, 2004

(54) RETROREFLECTIVE ARTICLES HAVING MULTILAYER FILMS AND METHODS OF MANUFACTURING SAME

(75) Inventors: James E. Lasch, Oakdale, MN (US); Paul J. Wang, Woodbury, MN (US); Raymond L. Lucking, Hastings, MN (US); Terry R. Bailey, Woodbury, MN (US); Kanta Kumar, Maplewood, MN (US); Michael A. Essien, Woodbury, MN (US); Jeffrey D. Janovec, River Falls, WI (US); Jaime R. Ojeda, Woodbury, MN (US); Michael D. Currens, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 97 days.

(21) Appl. No.: 09/636,190

(22) Filed: Aug. 10, 2000

Related U.S. Application Data

(63) Continuation-in-part of application No. 09/393,369, filed on Sep. 10, 1999, now abandoned.
(60) Provisional application No. 60/164,284, filed on Nov. 5, 1999.

(51) Int. Cl.[7] .......................... B32B 3/00; B32B 27/30; B32B 27/40
(52) U.S. Cl. ................. 428/161; 359/529; 359/530; 428/166; 428/204; 428/206; 428/209; 428/210; 428/424.2; 428/424.4; 428/424.8
(58) Field of Search ................. 428/424.8, 424.2, 428/424.4, 161, 210, 206, 209, 166, 204; 359/529, 530; 523/172

(56) References Cited

U.S. PATENT DOCUMENTS

| | | | |
|---|---|---|---|
| 2,326,634 A | 8/1943 | Gebhard et al. | 88/82 |
| 2,354,018 A | 7/1944 | Heltzer et al. | 88/82 |
| 2,354,048 A | 7/1944 | Palmquist | 40/135 |
| 2,354,049 A | 7/1944 | Palmquist | 40/135 |
| 2,379,702 A | 7/1945 | Gebhard | 88/82 |
| 2,379,741 A | 7/1945 | Palmquist | 88/82 |
| 2,407,680 A | 9/1946 | Palmquist | 88/82 |
| 3,190,178 A | 6/1965 | McKenzie | 88/82 |
| 3,403,862 A | 10/1968 | Dworjanyn | 239/566 |
| 3,551,025 A | 12/1970 | Bingham et al. | 350/105 |
| 3,795,435 A | 3/1974 | Schwab | 350/105 |
| 4,025,159 A | 5/1977 | McGrath | 350/105 |
| 4,082,877 A | 4/1978 | Shadle | 428/35 |
| 4,418,120 A | 11/1983 | Kealy et al. | 428/343 |
| 4,444,826 A | 4/1984 | Sasaki et al. | 428/216 |
| 4,505,967 A | 3/1985 | Bailey | 428/164 |
| 4,530,859 A | 7/1985 | Grunzinger, Jr. | 427/385.5 |

(List continued on next page.)

FOREIGN PATENT DOCUMENTS

| | | |
|---|---|---|
| JP | 58-135883 U | 8/1983 |
| JP | 5-092522 | 4/1993 |
| WO | WO 99/36254 | 7/1996 |

OTHER PUBLICATIONS

ASTM F 1238–95, pp. 311–312.
ASTM D 4956–95, pp. 490–495.
ASTM E 810–94, pp. 782–788.
ASTM D 952–95, pp. 186–188.
ASTM D 446–97, pp. 193–215.
ASTM D 1525–98, pp. 311–317.

*Primary Examiner*—D. S. Nakarani
(74) *Attorney, Agent, or Firm*—Carolyn A. Fischer

(57) ABSTRACT

Retroreflective articles having multilayer films are useful for commercial graphics and retroreflective products, such as roll-up signs for highway transportation safety. The articles comprise multilayer films having at least one layer of polyurethane and at least one layer of a copolymer of alkylene and at least one non-acidic, polar co-monomer. Articles having the new multilayer films provide the same or improved performance, are less expensive, and offer improved methods for manufacturing, when compared to prior articles.

30 Claims, 7 Drawing Sheets

U.S. PATENT DOCUMENTS

| | | | |
|---|---|---|---|
| 4,588,258 A | 5/1986 | Hoopman | 350/103 |
| 4,663,213 A | 5/1987 | Bailey et al. | 428/204 |
| 4,664,966 A | 5/1987 | Bailey et al. | 428/203 |
| 4,897,136 A | 1/1990 | Bailey et al. | 156/145 |
| 4,908,278 A | 3/1990 | Bland et al. | 428/500 |
| 4,950,525 A | 8/1990 | Bailey | 428/164 |
| 5,064,272 A | 11/1991 | Bailey et al. | 359/541 |
| 5,069,964 A | 12/1991 | Tolliver et al. | 428/325 |
| 5,117,304 A | 5/1992 | Huang et al. | 359/529 |
| 5,138,488 A | 8/1992 | Szczech | 359/529 |
| 5,405,643 A | 4/1995 | Scholz | 427/2.31 |
| 5,450,235 A | 9/1995 | Smith et al. | 359/529 |
| 5,480,705 A | 1/1996 | Tolliver et al. | 428/217 |
| 5,498,232 A | 3/1996 | Scholz | 602/8 |
| 5,614,286 A | 3/1997 | Bacon, Jr. et al. | 428/161 |
| 5,656,121 A | 8/1997 | Fukushi | 156/326 |
| 5,706,132 A | 1/1998 | Nestegard et al. | 359/529 |
| 5,714,223 A | 2/1998 | Araki et al. | 428/68 |
| 5,754,338 A | 5/1998 | Wilson et al. | 359/530 |
| 5,784,198 A | 7/1998 | Nagaoka | 359/534 |
| 5,812,316 A | 9/1998 | Ochi et al. | 359/530 |
| 5,820,988 A | 10/1998 | Nagaoka | 428/423.1 |
| 5,840,705 A | 11/1998 | Tsukada et al. | 514/43 |
| 5,882,771 A | 3/1999 | Klein et al. | 428/161 |
| 5,914,812 A | 6/1999 | Benson et al. | 359/529 |
| 5,977,263 A | 11/1999 | Phillips | 525/329.9 |
| 6,004,422 A | 12/1999 | Janovec et al. | 156/276 |
| 6,106,982 A | 8/2000 | Mientus et al. | 430/14 |
| 6,156,252 A | 12/2000 | Freedman | 264/173.15 |

RETROREFLECTIVE ARTICLES HAVING MULTILAYER FILMS AND METHODS OF MANUFACTURING SAME

CROSS REFERENCE TO RELATED APPLICATIONS

This application is a continuation-in-part of nonprovisional application Ser. No. 09/393,369 filed Sep. 10, 1999, now abandoned, and claims the benefit of the filing date of application Ser. No. 09/393,369 and the benefit of the filing date of copending provisional Application Serial No. 60/164,284 filed Nov. 5, 1999.

FIELD

The invention relates to retroreflective articles and other articles useful for various applications, such as graphic designs and retroreflective products.

BACKGROUND

Articles containing polymer films have wide utility in such applications as commercial graphics for advertising and for retroreflective products. Specifically, retroreflective products (e.g., bead-based and prismatic-type (e.g. cube corner) retroreflective sheeting) have been developed to provide increased safety, especially during periods of reduced visibility. These articles may encounter demanding environments, such as extremes in temperature, chemical challenges from atmospheric pollution and road salt, and photo-reaction involving infrared, visible, and ultraviolet radiation from sunlight.

Polymers used for these articles should preferably achieve a high performance in order to withstand such conditions. Examples of prior polymers commonly used for making various articles are polyvinyl chloride (PVC), fluoropolymers, acrylics, and polyurethane.

Multilayer films containing the prior polymers have also been used in various articles. Such prior multilayer films also have had disadvantages. For example, certain prior multilayer films (which usually have had only two layers) may not be sufficiently flexible, may delaminate, or may be too expensive for commercial use.

Substitutes for these prior polymers or multilayer films would be desirable in order to avoid the above disadvantages. Thus, there are unmet needs for inexpensive polymer films that exhibit high performance (such as flexibility), are simple to make, and are environmentally friendly.

SUMMARY

The present invention provides retroreflective articles that comprise a plurality of retroreflective elements; and a substantially continuous, substantially contiguous multilayer film having at least one layer of a urethane polymer and a core layer of a copolymer of alkylene (e.g., ethylene) and at least one non-acidic, polar co-monomer. The retroreflective elements may comprise transparent beads cooperating with a reflective coating or microstructured prism elements.

The present invention also provides novel multilayered films of contiguous layers including at least one layer of a urethane polymer and a core layer of a copolymer of alkylene and at least one non-acidic, polar comonomer. Novel methods of making such films are also disclosed.

In one embodiment, the core layer of an alkylene copolymer is formed from ethylene monomer and at least one non-acidic co-monomer selected from at least one of vinyl acetate, acrylate, and carbon monoxide. Typically, the ethylene copolymer comprises between 55 and 95 weight percent ethylene; and between 5 and 40 weight percent non-acidic co-monomer. If desired, the alkylene copolymer may further comprise an acidic or anhydride based co-monomer, typically less than about 10 weight percent of an acidic co-monomer.

Particularly preferred ethylene copolymers for use in the multilayered films of the present invention include: ethylene vinyl acetate ("EVA"), acid-modified EVA, anhydride-modified EVA, acid-acrylate-modified EVA, anhydride-acrylate-modified EVA, ethylene ethyl acetate ("EEA"), ethylene methyl acetate ("EMA"), acid- or anhydride-modified ethylene acrylate ("AEA"), ethylene/vinyl acetate/carbon monoxide copolymer ("EVACO"), ethylene/n-butyl acrylate/carbon monoxide copolymer ("EBACO"), and ethylene/n-butyl acrylate copolymer ("EnBA").

BRIEF DESCRIPTION OF THE DRAWINGS

The invention will be further explained with reference to the drawings, wherein.

Figure 1A:
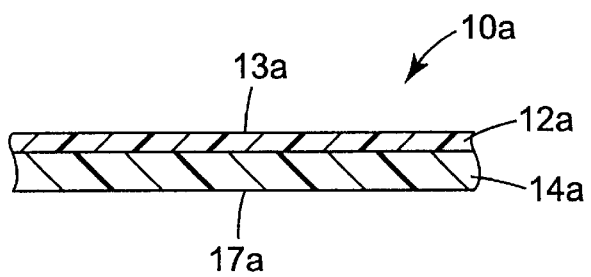
FIGS. 1a–d are cross-sectional views of multilayer films.

These figures, which are idealized, are not to scale and are intended to be merely illustrative and non-limiting.

DEFINITIONS

The multilayer films used in the invention are "substantially continuous". Such substantially continuous multilayer films can comprise incidental discontinuities but are intended to be continuous over a substantial area, that is, over an area of one hundred or more adjacent retroreflective elements when the film is incorporated into a retroreflective article having a plurality of typical retroreflective elements. Also, the multilayer films are "substantially contiguous". Such substantially contiguous multilayer films can comprise incidental sites in which adjoining layers of the multilayer film are not contiguous, but such incidental noncontiguous sites are intended to be relatively insubstantial. Preferably, when the multilayer film is incorporated into a retroreflective article comprising a plurality of typical retroreflective elements, such noncontiguous sites have an average area per site that is less than the area of an average single retroreflective element. As used in this paragraph, "area" refers to measurements made normal to the major surfaces of the multilayer film.

As used herein, the phrases "core layer of an alkylene copolymer" or "alkylene core layer" refer to a layer in a multilayer film that comprises a copolymer of alkylene and at least one non-acidic, polar co-monomer. The term "alkylene copolymer" refers to copolymers having alkylene and one other co-monomer, as well as copolymers having alkylene and two or more different co-monomers. Consequently, a "terpolymer" of alkylene, vinyl acetate and another co-monomer will be included in the definition of an alkylene copolymer.

As used herein, the phrases "core layer of an ethylene copolymer" or "ethylene core layer" refer to a layer in a multilayer film that comprises a copolymer of ethylene and at least one non-acidic, polar co-monomer. The term "ethylene copolymer" refers to copolymers having ethylene and one other co-monomer, as well as copolymers having ethylene and two or more different co-monomers. Consequently, a "terpolymer" of ethylene, vinyl acetate and another co-monomer will be included in the definition of an ethylene copolymer.

As used herein, the phrase "layer of a urethane polymer" refers to a layer in a multilayer film that comprises a urethane-containing polymer or copolymer. Such materials may alternatively be referred to as a "polyurethane." The term "polyurethane" typically includes polymers having urethane or urea linkages, and such is the intended meaning herein.

As used herein, the phrase "tie layer" refers to a layer that adheres two or more other polymer layers to each other, usually when the other polymer layers would not sufficiently adhere to each other absent the tie layer therebetween.

As used herein, the phrases "weatherable" or "outdoor durability" refer to the capability of the material to withstand the environment when used for its intended purpose.

As used herein, the phrase "weathering" shall mean exposing an article to either natural or artificial environments that include heat, light, moisture, and ultraviolet radiation, and combinations thereof.

DESCRIPTION OF ILLUSTRATIVE EMBODIMENTS

The present invention provides multilayer films (and articles made with multilayered films) that solve one or more of the unmet needs noted above.

We have discovered that multilayer films comprising at least one layer of a urethane polymer (e.g., polyurethane); and at least one core layer of an alkylene copolymer, i.e., a copolymer of alkylene and at least one non-acidic, polar co-monomer (e.g., an ethylene-vinyl-acetate copolymer (EVA)), may be substituted for various prior polymer films (e.g., single-layer urethane films) and yet achieve the same or improved performance with reduced cost. As noted above, the multilayer films can comprise the urethane polymer layer(s) and core layer. The multilayer films can also consist of or consist essentially of such layers. The multilayer films may, in certain circumstances, further comprise polymers or layers of polymers (e.g., inexpensive polymers) that generally would be unsuitable for certain applications if used alone. For example, low density polyethylenes (LDPE), polyolefins, and ethylene-acrylic-acid copolymers (EAA) are relatively inexpensive, although lacking the performance of polyurethane. Thus, the use of the multilayer films of the invention enables the incorporation of other inexpensive polymers and layers of inexpensive polymers, such as low density polyethylene, polyolefins, EAA, ethylene-methacrylic-acid copolymers (EMAA) and ionomer resins.

The new films of the present invention preferably utilize polymers and methods that enable the films to be made continuously, for example, by efficient co-extrusion manufacturing processes. Specifically, multilayer films comprising at least one layer of urethane polymer and at least one core layer of alkylene copolymer have been discovered to provide the performance of prior polymer films and yet produce an article that is more economical. This is surprising because many copolymers of alkylene and a non-acidic, polar co-monomer, if used alone, tend to be too soft, too sticky, or lack the durability, dirt resistance, solvent resistance or temperature stability required for high performance films used for many articles. However, it has been surprisingly discovered that by using the combination of a layer of a urethane polymer and a core layer of a copolymer of alkylene and at least one non-acidic, polar comonomer in a multilayer film, one may produce improved articles, especially those used for retroreflective products.

I. Embodiments of Multilayer Films

FIGS. 1a–d illustrates multilayer films that may be used for constructing an article. These inventive multilayer films preferably have improved properties when compared to prior films used for articles. The properties of the films are tailored by the selection of the multilayer film layers. Properties that may be controlled by polymer selection and layer thickness include durability, flexibility, extensibility, adhesion to other polymers, and cost. For example, proper selection of the exposed surfaces (e.g., surface layers) of the multilayer film may be used as a means for attaching dissimilar or otherwise incompatible polymers. In addition, each layer in the multilayer film may serve the same or different functions as desired. For example, some of the functions each individual layer may serve are to (1) improve the bonding between layers; (2) provide weatherability or durability; (3) decrease cost; (4) improve processability; (5) provide solvent resistance; (6) provide color or opaqueness; (7) provide flexibility; (8) provide control of encapsulation of the scrim; (9) provide graffiti resistance; (10) provide thermal resistance; (11) provide transparency: (12) provide moldability; (13) provide conspicuity via fluorescence or other means; (14) provide transparency for retroreflectivity; (15) provide image receptivity; (16) provide abrasion resistance; and (17) provide water vapor resistance. The multilayer films of this invention are typically carefully selected to provide the desired function required for each article.

Suitable multilayer films of the present invention have a number of polymer layers "n" that may be from 2 to hundreds (e.g., 500 or more). Preferably, n is from 2 to 7, more preferably n is from 2 to 5, most preferably n is from 2 to 4, and optimally n is 3.

Bilayer film 10a (i.e., where n=2) is illustrated in FIG. 1a. This film may be used "as is" or as a building unit for articles or other multilayer films. Bilayer film 10a has first layer 12a, core layer 14a, first major surface 13a and second major surface 17a.

First layer 12a comprises a urethane polymer or copolymer (e.g., polyurethane). Depending on the particular article in which the film is used, the polyurethane layer may function as a bonding layer, a weatherable layer, or another function. Those skilled in the art will recognize that the term "polyurethane" typically includes polymers having urethane or urea linkages, and such is the intended meaning herein.

Suitable urethane polymers or copolymers for use in this layer include polyether polyurethanes, polyester polyurethanes, polycarbonate polyurethanes and blends thereof. Suitable urethanes include aliphatic or aromatic urethanes or blends thereof. Typically, many suitable thermoplastic polyurethanes include three main components: an aliphatic or aromatic diisocyanate; a chain extender (such as an ethylene-, propylene- or butane- diol); and a soft segment polyol (such as polyether or polyester, e.g., polyethyleneoxide, polyadipate, or polycaprolactone).

Preferred urethane polymers are extrudable using typical extrusion equipment. However, solvent-based or water-based urethanes may be used, e.g., by coating, if desired.

An example of a suitable blend comprises from about 50 to about 99 weight percent aliphatic polyester polyurethane with about 1 to 50 weight percent of a pigmented aromatic polyether polyurethane. Specifically, one suitable blend is that of 60 weight percent of the aliphatic polyester polyurethane available under the trade designation MORTHANE PNO3.214, from Rohm and Haas, Seabrook, N.H., with 40 weight percent of a pigmented aromatic polyether polyurethane. The pigmented aromatic polyether polyurethane includes 50 weight percent aromatic polyether polyurethane available under the trade designation ESTANE No. 58810, available from B.F. Goodrich Co., Cleveland, Ohio, and 50 weight percent titanium dioxide, previously compounded by suitable means, such as in a twin screw extruder, and subsequently pelletized.

Suitable urethane polymers include thermoplastic polyurethane polymers from Morton available under the trade designation MORTHANE, including polycaprolactone based aliphatic thermoplastic polyurethanes such as MORTHANE PNO3.214, and polyester based aliphatic thermoplastic polyurethanes such as MORTHANE PN343-101, PN343-200, PN343-201, PN343-203, and PN3429-105. Suitable urethane polymers also include the following, which are available under the trade designations ELASTOLLAN 1100—Series Ether TPU, ELASTOLLAN 600—Series Ester TPU, ELASTOLLAN C—Series Ester TPU, and ELASTOLLAN S—Series Ester TPU, available from BASF Corporation; and available under the trade designations DESMOPON and TEXIN from Bayer Corporation. Other suitable urethanes include aliphatic and aromatic polyurethane such as disclosed in U.S. Pat. No. 5,117,304 (Huang), water-based urethanes such as the polyurethane available under the trade designation NEOTAC from Avecia Limited and solvent-based polyurethanes such as the polyurethane available under the trade designation Q-THANE QC4820 (a 12 weight percent solids solution) from K. J. Quinn and Co., Inc., Seabrook, N.H.

Typically, the thickness of first layer 12a is kept as thin as possible to achieve the desired properties. In many embodiments, the multilayered film of the present invention is useful in articles as a substitute for a single-layer film of polyurethane. While layer 12a should be thick enough to provide the desired properties, e.g., desired surface properties, of the prior single-layer film, subsequent layers of the multilayer film (e.g., including core layer 14a) can be made from a thinner or thicker layer of a significantly less costly material, and thus the benefits of minimizing the thickness of layer 12a will be apparent. For example, when the article employs a single-layer film of polyurethane having a thickness of 0.075 mm (e.g., the overlay film for a roll up sign) or 0.033 mm (e.g., the top film for license plate sheeting) the multilayered films of the present invention will often be approximately the same total thickness. However, the thickness of first layer 12a preferably is less than 50%, more preferably less than 30%, and most preferably less than 15% of the combined thickness of the multilayer film.

Suitable urethane polymers have a melt index generally between 10 and 100, more preferably between 20 and 60 dg/min. when tested according to ASTM D1238 at 190° C. and with an 8.7 Kg weight.

Preferred urethane polymers have a weight average molecular weight of between about 30,000 and 200,000, more preferably between about 60,000 and 120,000, when measured by gel permeation chromatography using polystyrene as a calibration standard.

Preferred urethane polymers, when used as a surface layer of a multilayer film, provide good solvent resistance, dirt resistance, good cold temperature flexibility, good image receptivity and adequate abrasion resistance.

Core layer 14a comprises a copolymer of alkylene (e.g., ethylene or propylene) and at least one non-acidic, polar co-monomer. Some preferred co-monomers include: vinyl acetate, acrylate (e.g., ethyl acrylate, methyl acrylate, n-butyl acrylate, etc.), and carbon monoxide. If desired, small amounts of acidic or anhydride base co-monomers (e.g., acrylic acid, methacrylic acid, maleic anhydride, etc.) may also be used.

Preferred alkylene copolymers comprise between 55 and 95 weight percent alkylene. More preferred alkylene copolymers comprise between 60 and 85 weight percent alkylene. Most preferred alkylene copolymers comprise between 67 and 80 weight percent alkylene. Preferred ethylene copolymers comprise between 55 and 95 weight percent ethylene. More preferred ethylene copolymers comprise between 60 and 85 weight percent ethylene. Most preferred ethylene copolymers comprise between 67 and 80 weight percent ethylene. In general, as the percentage of alkylene is decreased (i.e., the percentage of non-acidic, polar co-monomer is increased) the copolymer's flexibility increases. The use of small amounts of acidic or anhydride co-monomers can change this general trend. When small amounts of such co-monomers are used the flexibility generally decreases as compared to copolymers without the acidic or anhydride co-monomer.

Suitable alkylene copolymers comprise less than about 10 weight percent acidic co-monomer; preferred ethylene copolymers less than 5 weight percent acidic co-monomer; more preferably less than 3 weight percent acidic co-monomer, most preferably less than 2 weight percent acidic co-monomer; and optimally less than 1 weight percent acidic co-monomer.

Depending on the particular embodiment in which the film is used, the core layer may function as a tie layer to other polymer layers or to substrates or may function to reduce the overall cost of the multilayer film.

Suitable copolymers for use in the core layer or other layers of the multilayer film include: copolymers of ethylene with vinyl acetate (EVA); acid- or anhydride-modified EVAs; other modified EVAs, such as acid or anhydride-/acrylate-modified EVAs; ethylene ethyl acrylate copolymers (EEA); ethylene methyl acrylate copolymers (EMA); acidor anhydride-modified ethylene acrylate materials (AEA); ethylene vinyl acetate, carbon monoxide terpolymers (EVACO); ethylene n-butyl acrylate, carbon monoxide terpolymers (EBACO); and ethylene n-butyl acrylate copolymers (EnBA).

Suitable EVAs (copolymers of ethylene with vinyl acetate) for use in films of the present invention include resins from DuPont available under the trade designation ELVAX. ELVAX resins are copolymers of ethylene and vinyl acetate. Typical grades range in vinyl acetate content from 9 to 40 weight percent and in melt index from 0.3 to 500 dg/min. (per ASTM D1238). Suitable ELVAX resins include grades 770, 760, 750, 670, 660, 650, 565, 560, 550, 470, 460, 450, 360, 350, 310, 265, 260, 250, 240, 220, 210, 205, 150, 140 and 40. Suitable EVAs also include high vinyl acetate ethylene copolymers from Quantum/Equistar available under the trade designation ULTRATHENE. ULTRATHENE materials are copolymers of ethylene and vinyl acetate. Typical grades range in vinyl acetate content from 7 to 29 weight percent. Suitable ULTRATHENE grades include UE 630, 632, 634, 635, 637, 646-04, 648, 652, 655, 656, 657, 662, 685-009, 688, 672, and 757-026. Suitable EVAs also include EVA copolymers from AT Plastics available under the trade designation ATEVA. Typical grades range in vinyl acetate content from 7 to 23 weight percent. Suitable ATEVA grades include 1030, 1081, 1070, 1211, 1221, 1231, 1240A, 1609, 1615, 1641, 1645, 1711, 1807, 1815, 1821, 1825A, 1841, 1941C, 2306E, 2911M, and 3211.

Those skilled in the art will be able to determine (e.g., via Z-peel tests) that alkylene copolymers with higher co-monomer contents and melt indices are generally more readily melt-bonded. However, melt-bond strengths may decrease at very high melt indices or co-monomer contents.

The flexibility of EVAs can be varied as desired. Generally, the higher the percentage of vinyl acetate, the more flexible. For example, ELVAX resins in the 700 and 600 series (which have 9 and 12 weight percent vinyl acetate content, respectfully) are twice as flexible as LDPE. ELVAX resins in the 500 and 400 series (which have 15 and 18 weight percent vinyl acetate content, respectfully) are three times as flexible as LDPE; resins in the 300 and 200 series (which have 25 and 28 weight percent vinyl acetate content, respectfully) are seven times as flexible as LDPE.

Suitable modified EVAs for use in films of the present invention include ELVAX acid terpolymer resins from DuPont; and modified ULTRATHENE materials from Quantum/Equistar; and resins from DuPont available under the trade designation BYNEL. These materials are derived from ethylene, vinyl acetate and an organic acid or an organic anhydride. Typical commercial grades have a vinyl acetate content of 25 or 28 percent and an acid number of 4 to 8 milligrams potassium hydroxide per gram polymer. Suitable ELVAX acid terpolymer resins include grades 4310, 4320, 4355 and 4260. Suitable ULTRATHENE grades include UE SP011. Suitable BYNEL grades include series 1100 acid modified EVA (e.g., grades 11E554, 11E573, 1123, 1124), and series 3000, 3800 and 3900 anhydride-modified EVA (e.g., grades 3030, 3048, 3062, 3080, 3095, 3810, 3859, 3860, 3861, E418, 3930, 3933).

Suitable other modified EVAs for use in films of the present invention include BYNEL series 3100 resins from DuPont. These materials are derived from ethylene, vinyl acetate, an acrylate and an organic acid or an organic anhydride. Suitable materials of this type include BYNEL series 3101, 3120 and E326 modified EVAs.

Preferred modified EVAs have an acid content generally less than 3 percent by weight acidic co-monomer). More preferred modified EVAs have an acid content less than 1 weight percent.

Preferred EVAs and modified EVAs have a vinyl acetate content between about 5 and 45 weight percent, more preferably between about 15 and 40 weight percent and most preferably between about 20 and 33 weight percent.

Suitable EEAs (ethylene ethyl acrylate copolymers) for use in films of the present invention include resins from DuPont available under the trade designation ALATHON and copolymers from Union Carbide Corporation available under the trade designation UNION CARBIDE DPD. ALATHON EEA is a random copolymer of ethylene and ethyl acrylate. In general, EEA has characteristics quite similar to those of EVA; however, it may be slightly more flexible at the same weight percent co-monomer. Preferred EEAs have a co-monomer content between about 5 and 45 weight percent, more preferably between about 9 and 40 weight percent and most preferably between about 20 and 33 weight percent. Typically, the EA co-monomer content is between about 9 and 35 percent. Also, EEA has very desirable low temperature flexibility. Suitable grades of ALATHON resins include A-701, A-702, A-703, A-704, A-707, A-709, and A-710. Suitable grades of DPD copolymer include DPD-6169 EEA.

Suitable EMAs (ethylene methyl acrylate copolymer) for use in films of the present invention include resins from Chevron available under the trade designations EMAC and EMAC+, and resins from Atofina Chemicals, Inc. available under the trade designation LOTADER. EMA is a random copolymer of ethylene and methyl acrylate. In general, EMA has characteristics quite similar to those of EEA. Suitable grades of EMAC resins include PE 2205, 2207, 2255, 2260 and 2268. Suitable grades of EMAC+ resins include SP 1305 and 2305T. LOTADER resins are EMA copolymers modified with glycidyl methacrylate. Suitable grades of LOTADER resins include AX8900 and AX8930. Preferred EMAs have a co-monomer content between about 5 and 45 weight percent, more preferably between about 15 and 33 weight percent and most preferably between about 20 and 28 weight percent.

Suitable AEAs (acid- or anhydride-modified ethylene acrylate materials) for use in films of the present invention include BYNEL series 2000 (e.g., grades 20E482, 2002, 2014, 2022 and E403) and series 2100 (e.g., grades 2169 and 2174) resins from DuPont. Preferred AEAs have an acid content generally less than 3% (by weight of acidic co-monomer), more preferred AEAs have an acid content less than 1 weight percent. Preferred AEAs have a co-monomer content between about 5 and 45 weight percent, more preferably between about 15 and 33 weight percent and most preferably between about 20 and 28 weight percent.

Suitable EVACOs (ethylene/vinyl acetate/carbon monoxide copolymers) for use in films of the present invention include resins from DuPont available under the trade designation ELVALOY. EVACO is a terpolymer of ethylene and vinyl acetate and carbon monoxide. Suitable grades of ELVALOY resins include 741, 742, and 4924. Other suitable ELVALOY materials include EBACOs (ethylene/ n-butyl acrylate/carbon monoxide terpolymers), such as ELVALOY grades HP441, HP551, HP66 1, HP662, HP771 and 4051. Preferred EVACOs and EBACOs have a co-monomer content between about 5 and 45 weight percent, more preferably between about 15 and 33 weight percent and most preferably between about 20 and 28 weight percent.

Suitable EnBAs (ethylene/n-butyl acrylate copolymers) for use in films of the present invention include resins from Quantum/Equistar available under the trade designations ENATHENE and VYNATHENE. ENATHENE resins are copolymers of ethylene and n-butyl acrylate. Suitable grades of ENATHENE resins include EA 720-009, EA 80808 and EA 89822. Typically, the nBA co-monomer content is between about 20 and 35 percent. VYNATHENE resins are also copolymers of ethylene and n-butyl acrylate. Suitable grades of VYNATHENE resins include PE 4771 and 4774. Typically, the nBA co-monomer content is between about 5 and 19 percent. Preferred EnBAs have a co-monomer content between about 5 and 45 weight percent, more preferably between about 20 and 35 weight percent and most preferably between about 20 and 28 weight percent.

Preferred ethylene copolymers for use in the multilayer films of the present invention have a melt index generally between 0.8 and 800, more preferably between 1 and 100, and most preferably between 3 and 20 dg/min. when tested according to ASTM D1238 at 190° C. and with an 8.7 Kg weight. When the multilayered film is processed using a blown film method the range of preferred melt indexes is somewhat lower.

Figure 1B:
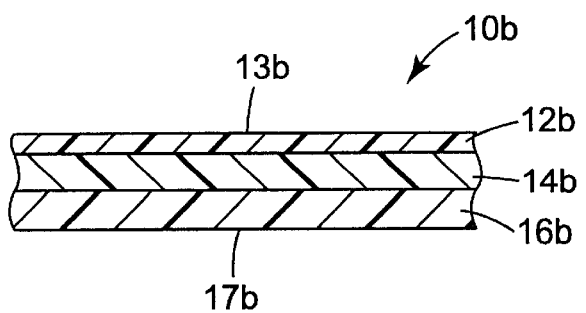

Trilayer film 10b (i.e., where n=3) is illustrated in FIG. 1b. This film has first layer 12b and core layer 14b as previously discussed with regards to layers 12a and 14a, respectively. Film 10b includes a third layer 16b. In the embodiment illustrated in FIG. 1b, first major surface 13b is a surface of layer 12b and second major surface 17b is a surface of third layer 16b.

As an example, a trilayer film 10b may be formed of a first layer 12b having a first major surface 13b,a core layer 14b, and a third layer 16b having a second major surface 17b and capable of forming a weatherable layer or providing some other suitable function. For example, the first layer may be a polyurethane, the core layer may be an alkylene copolymer (e.g., EVA or modified EVA), and the third layer may be EAA, EMAA or an ionomer resin. Notably, the core layer 14b solves the problems of (1) the polyurethane having poor adhesion to the third layer (e.g., EAA), and (2) using a thick layer of rather expensive polyurethane. In certain circumstances a core layer may be soft and tacky which, if exposed, would cause difficulty in processing, such as web handling, roll blocking, or sticking to a hot roll. The third layer 16b (e.g., an EAA layer) avoids these problems.

Another preferred trilayer film 10b is a film having a first major surface of polyurethane, a core layer of an alkylene copolymer (e.g., EVA or modified EVA), and a second major surface of polyurethane.

Preferably, the urethane layer and the core layer are selected in such a manner that they exhibit sufficient adhesion to each other for the desired performance.

However, it may be desirable to provide a tie layer (not shown) between the urethane layer and the core layer (e.g., between layers 12a and 14a of FIG. 1a or between layers 12b and 14b of FIG. 1b, etc.) to further enhance such properties. Suitable such tie layers include blends of the aforementioned polyurethanes and alkylene copolymers. A tie layer comprising such blends can have properties favorable for the joining of the urethane layer and the core layer. These blends as polymer layers, and their use in multilayered films, are within the scope of this invention.

Figure 1C:
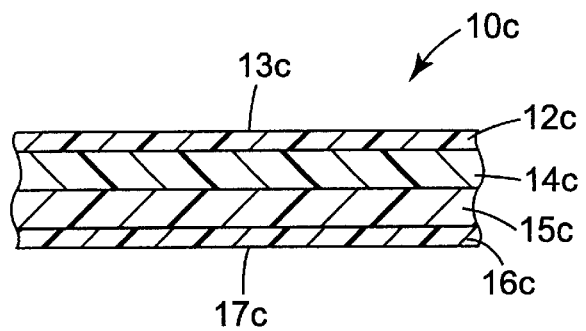

A preferred four-layer film 10c (i.e., where n=4) is illustrated in FIG. 1c. This film has first layer 12c, core layer 14c and layer 16c as previously discussed with regards to layers 12b, 14b and 16b, respectively. Film 10c includes an additional layer 15c. As illustrated in FIG. 1c, this example of a four-layer film has first major surface 13c and second major surface 17c of polyurethane or EAA, core layer 14c of an alkylene copolymer (e.g., a modified EVA), and layer 15c of a different alkylene copolymer (e.g., a different modified EVA).

Figure 1D:
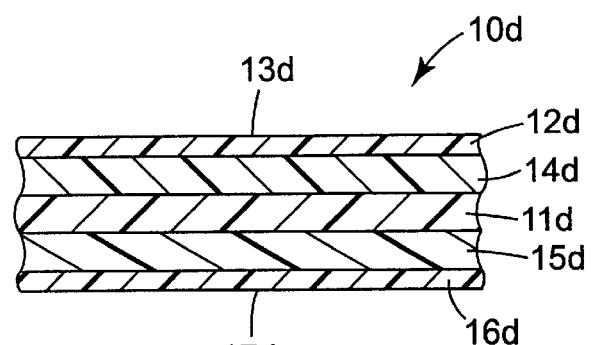

A preferred five-layer film 10d (i.e., where n=5) is illustrated in FIG. 1d. This film has first layer 12d, core layer 14d, layer 15d and layer 16d as previously discussed with regards to layers 12c, 14c, 15c and 16c, respectively. Film 10d includes an additional central layer 11d. As illustrated in FIG. 1d, this example of a five-layer film has a polyurethane layer 12d having a first major surface 13d and an opposing polyurethane layer 16d having a second major surface 17d, a core layer 14d of alkylene copolymer (e.g., EVA), a central layer 11d of either a low density polyethylene or of EAA, and a layer 15d of alkylene copolymer (e.g., EVA). Layers 14d and 15d function to anchor layers 12d and 16d to the film. When the softness of EVA is a problem, the core layer of EVA (e.g., 14b of FIG. 1b) may be replaced with a multilayer construction having a center layer of, for example, a harder polyolefin layer sandwiched between layers of EVA. This three-layered construction may then be used, for example, as a substitute for layer 14b of FIG. 1b to form a five-layer film. In general, multilayer films that include layers of relatively inexpensive polymers, such as low density polyethylene, EAA, EMAA or ionomer resin, have the advantage of being less expensive than a single film of the same thickness of polyurethane.

If desired, multilayer films having 6 layers, 7 layers, and up to "n" layers (where as noted above, n can be hundreds) may be made using various combinations of layers, depending on the needs of the films used for the article. Generally, when choosing a combination of layers, the most inexpensive polymers or adjuvants are placed in the least demanding functional location, which tend to be the layers within the multilayer film. For example, low density polyethylene preferably is placed in a non-exposed layer. The core layer is preferably an ethylene copolymer, such as EVA. The exposed major surfaces of the film are preferably high performance polymers, such as polyurethane.

Multilayer films comprising polymer layers that have poor bonding to one another, such as for example (1) a layer of polyurethane to a layer of EAA, or (2) a layer of EAA to polycarbonate, may delaminate when used in an article. This defect has been found to be prevented by using a tie layer, such as a layer of modified EVA, between the poorly bonding layers.

Many other suitable polymers may be employed to form the multilayer films of the present invention. Most preferably, these other optional polymers and layers of polymers will be co-extrudable with the urethane and alkylene copolymer layers. Illustrative examples of other polymers that may be used in the multilayer films of the present invention include acrylic polymers (e.g., polymethylmethacrylate (PMMA)); polycarbonates (PC); plasticized PVC; and polysulfone (PS).

Although multilayer films may be made by laminating preformed layers under heat or pressure conditions or by coating processes, a co-extrusion process is generally preferred because of reduced cost, improved bonding of the layers to each other, and the ability subsequently to draw the multilayer film to reduce its thickness. A presently particularly preferred co-extrusion process employs a multi-layered die with a feed block or a multi-manifold die that keeps the polymers separate until just prior to exiting the die. Preferably, a controlled temperature profile from the hopper feed end to the extrusion die end is maintained for each polymer, illustrative examples of suitable extrusion processes are found in U.S. Pat. No. 4,082,877 (Shadle); U.S.

Pat. No. 4,444,826 (Sasaki); U.S. Pat. No. 4,505,967 (Bailey); U.S. Pat. No. 4,663,213 (Bailey); U.S. Pat. No. 4,664,966 (Bailey); U.S. Pat. No. 4,897,136 (Bailey); U.S. Pat. No. 4,908,278 (Bland); U.S. Pat. No. 5,480,705 (Tolliver); and U.S. Pat. No. 5,656,121 (Fukushi).

Although multilayer films are discussed as having distinct layers, it will be appreciated that there may be both physical and chemical interaction between the layers and this is still within the scope of this invention. For example, post processing of the multilayer films, such as by post heating or thermal fusing, may cause the layers to become less distinct depending on the conditions used.

One skilled in the art will be able to develop suitable multilayer films given the above description.

II. Embodiments of Retroreflective Articles Comprising Multilayer Films

The types of retroreflective sheeting are described in "Standard Specification for Retroreflective Sheeting for Traffic Control" ASTM D4956-94. Brightness or retroreflectivity of the sheeting may be expressed as the Coefficient of Retroreflection, RA. This is measured in units of candelas/lux/square meter and is determined using standardized test ASTM E810-94.

The retroreflective elements in retroreflective sheeting typically comprise (1) beads, e.g., beads in a cooperative position with a reflective coating, or (2) microstructured elements, specifically prisms although other terms may also be used as will be discussed later. In this application, the term "prisms" will be used to describe these latter retroreflective elements.

Illustrative examples of exposed lens retroreflective sheeting are disclosed in U.S. Pat. No. 2,326,634 (Gebhard); U.S. Pat. No. 2,354,018 (Heltzer); U.S. Pat. No. 2,354,048 (Palmquist); U.S. Pat. No. 2,354,049 (Palmquist); U.S. Pat. No. 2,379,702 (Gebhard); and U.S. Pat. No. 2,379,741 (Palmquist).

Illustrative examples of enclosed lens retroreflective sheeting are disclosed in U.S. Pat. No. 2,407,680 (Palmquist); U.S. Pat. No. 3,551,025 (Bingham); U.S. Pat. No. 3,795,435 (Schwab); U.S. Pat. No. 4,530,859 (Grunzinger, Jr.); U.S. Pat. No. 4,664,966 (Bailey); U.S. Pat. No. 4,950,525 (Bailey); U.S. Pat. No. 5,064,272 (Bailey); and U.S. Pat. No. 5,882,771 (Klein).

Illustrative examples of encapsulated lens retroreflective sheeting are disclosed in U.S. Pat. No. 3,190,178 (McKenzie); U.S. Pat. No. 4,025,159 (McGrath); U.S. Pat. No. 4,663,213 (Bailey); U.S. Pat. No. 5,069,964 (Tolliver); U.S. Pat. No. 5,714,223 (Araki); U.S. Pat. No. 5,812,316 (Ochi); and U.S. Pat. No. 5,784,198 (Nagaoka).

Illustrative examples of encapsulated prismatic-type retroreflective sheeting are disclosed in U.S. Pat. No. 5,138,488 (Szczech); U.S. Pat. No. 5,450,235 (Smith); U.S. Pat. No. 5,614,286 (Bacon); U.S. Pat. No. 5,706,132 (Nestegard); U.S. Pat. No. 5714,223 (Araki ); and U.S. Pat. No. 5,754,338 (Wilson ).

Illustrative examples of raised-ridge prismatic-type retroreflective sheeting are disclosed in U.S. Pat. No. 5,914,812 (Benson).

Figure 2:
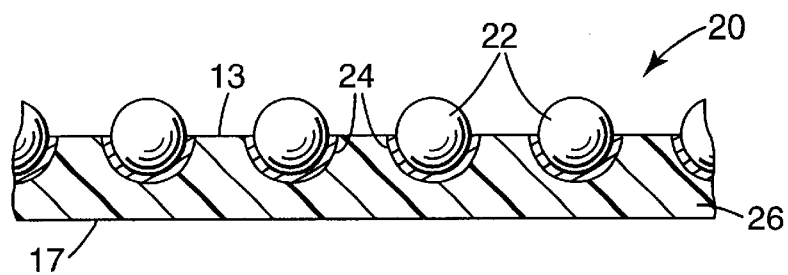
FIG. 2 is a cross-sectional view of an exposed lens retroreflective article.

FIG. 2 illustrates an exposed lens retroreflective article 20 having a bead bond layer 26 with a first major viewing surface 13 and an opposed major surface 17. In one embodiment, the bead bond layer 26 can be a multilayer film (having at least one layer of polyurethane and at least one core layer of alkylene copolymer), and the multilayer film can carry a plurality of retroreflective elements 22. The polyurethane layer serves to bond together the retroreflective elements (which are transparent beads) and may also serve as a weatherable layer. The beads have an air-exposed portion and an opposing hemispherical portion having a reflective coating 24 thereon. There is a first major viewing surface 13. In alternate embodiments, other types of multilayer films may be substituted for the bead bond layer. Such exposed lens articles may be useful, for example, as reflective sheeting on traffic cones.

Figure 3A:
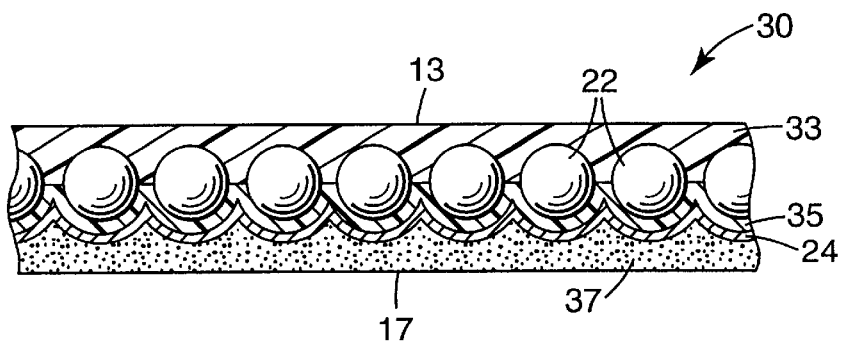
FIGS. 3a–b are cross-sectional views of an enclosed lens retroreflective article.
Figure 3B:
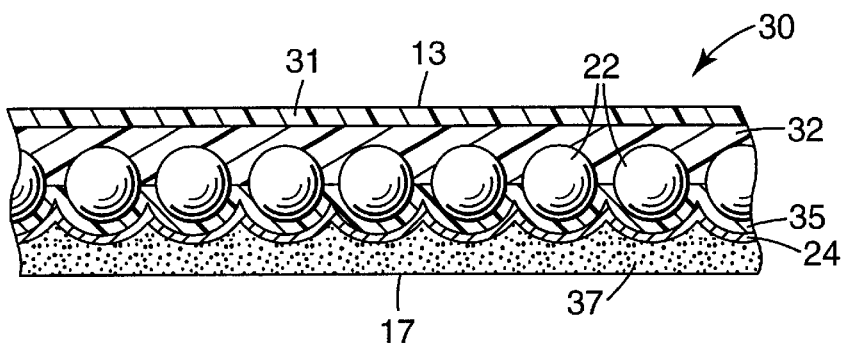

FIGS. 3a and 3b illustrate alternative enclosed lens retroreflective articles 30 having a face member (33 for FIG. 3a and 31 for FIG. 3b) with viewing surface 13, a retroreflective member including transparent beads 22 and a reflective layer 24 held in a cooperative position with respect to the beads by a space coat layer 35. In FIG. 3a, the transparent beads have a first hemispherical portion enclosed by the face member, and a second opposing hemispherical portion spaced at the cooperative position from the reflective coating. In FIG. 3b, the beads are enclosed by bead bond 32. An adhesive layer 37 has a major surface 17 opposed from the viewing surface.

The first major viewing surface 13 of the retroreflective article is the surface on a layer that may also be called the face member, overlay, cover film, top film, front face, top layers, or top coat, which for the purposes of this application are all equivalent terms. However, in this application, "face member" will be used as the general term. Suitable face members provide a substantially transparent viewing surface that protects the optical elements from a variety of possible destructive effects, such as dirt, water, and exposure to weather and outdoor conditions. Polymers selected for the face member are preferably dimensionally stable, durable, weatherable, and readily formable into a desired configuration. The face member is preferably sufficiently thick to provide the above desirable properties. The thickness of the face member preferably is between about 0.01 mm to 0.25 mm thick, and more preferably between 0.02 mm to 0.1 mm.

The face member (33 of FIG. 3a and 31 of FIG. 3b) preferably comprises a transparent multilayer film. One such multilayer film has an air exposed polyurethane layer that is capable of withstanding weather, a core layer (e.g., an alkylene copolymer such as EVA), and an underlying layer (e.g., EAA) capable of bonding to the retroreflective member.

Figure 4:
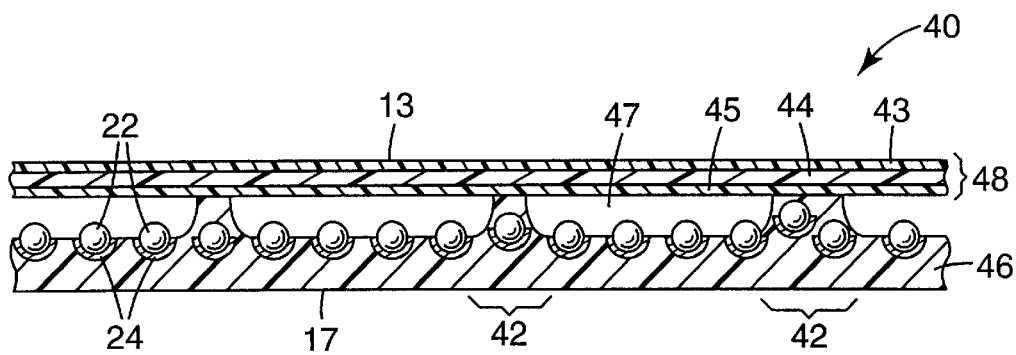
FIG. 4 is a cross-sectional view of an encapsulated lens retroreflective article.

FIG. 4 illustrates an encapsulated lens retroreflective article 40 whose face member 48 has viewing surface 13. A retroreflective member includes transparent beads 22 having a first hemispherical air exposed portion, and a second opposing hemispherical portion having the reflective coating 24 thereon. A sealing member 46, having a second major surface 17 opposed from the viewing surface, is bonded to portions of the face member 48 to form a pattern of seal legs, (such as the ones shown as 42 in FIG. 4), wherein the face member, the retroreflective member, and the seal legs form a plurality of encapsulated air cells 47, with the face member in spaced relation to the retroreflective member, and the air-exposed portions of the beads within the cells.

The face member 48 preferably comprises a transparent multilayer film. One such multilayer film has an air exposed layer 43 that is capable of withstanding weather, an inexpensive core layer 44, and an underlying layer 45 capable of bonding to the retroreflective member. For example, the air-exposed layer may be an EAA or a polyurethane, the core layer may be an alkylene copolymer (e.g., EVA or modified EVA), and the underlying layer may be a polyurethane.

The thickness of the face member 48 preferably is between about 0.025 mm and 0.1 mm.

The bonding portions between the face member and sealing member form seal legs. These legs have a height sufficient to provide an air interface for the unbonded portion of the face member. The seal legs may be formed, for example, by application of heat and pressure to the retroreflective member and the face member as disclosed in U.S. Pat. No. 3,190,178 (McKenzie). In this embodiment, the seal legs may form a sealing pattern of individual air tight cells each having a small area on the viewing surface 13.

Seal legs may also be called sealing walls, bonds, bond lines, septa, or seal leg members, which for the purposes of this application are all equivalent terms. Preferably the sealing member will provide a bond to the retroreflective member characterized by an average Z-peel peak load, measured in accordance with the test method described in the Examples below, of at least about 20 kilograms, more preferably at least about 30 kilograms, and most preferably greater than about 40 kilograms.

Figure 5A:
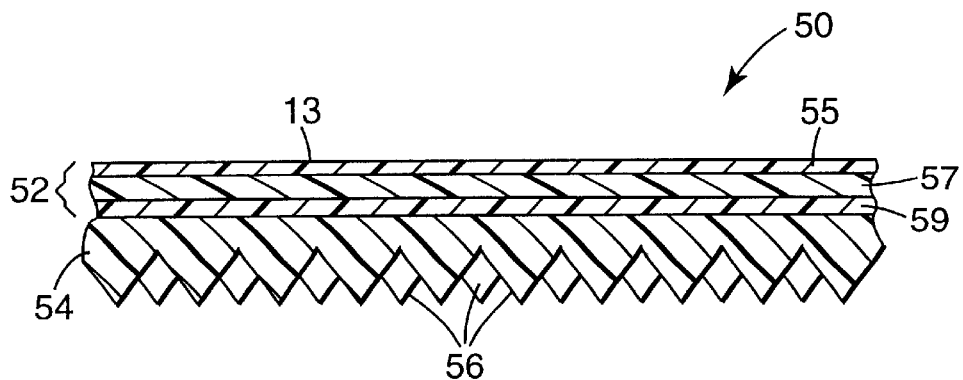
FIG. 5a is a cross-sectional view of an exposed prismatic-type retroreflective article.

FIG. 5a illustrates a reflector-coated prismatic-type retroreflective article 50 having a face member 52 with a major viewing surface 13, and a retroreflective member 54. The retroreflective member 54 has a first major surface in contact with the face member and a second opposing microstructured surface having retroreflective elements 56, such as prisms, with a reflective coating thereon.

The face member 52 preferably comprises a transparent multilayer film. One such multilayer film has an air exposed layer 55 that is capable of withstanding weather, an inexpensive core layer 57, and an underlying layer 59 capable of bonding to the retroreflective member. For example, the air exposed layer may be a polyurethane or EAA, the core layer may be an alkylene copolymer (e.g., EVA or modified EVA), such as BYNEL 3860, which is an anhydride-modified EVA polymer available from DuPont, and the underlying layer may be a polyurethane (e.g., an aliphatic polyester polyurethane), which can be laminated or otherwise bonded to, for example, a polycarbonate microstructured surface.

The total thickness of retroreflective members having cube corner retroreflective elements is typically between about 0.2 mm and 0.7 mm, but may be more or less depending on the polymers used. As the thickness of the retroreflective member decreases, the flexibility of the member may also be expected to increase.

Polymers are selected for the retroreflective member in view of the properties desired of the resultant article, the methods used for forming the retroreflective surface, the desired bondability to the sealing member, and the nature of any other members of the retroreflective article. Polymers selected for the microstructured layer preferably should form cube corner elements that are dimensionally stable so that precise geometry desired for retroreflection is maintained. The polymeric materials selected for the microstructured surface tend to be relatively inflexible, hard, and rigid materials with a high Vicat softening temperature relative to other polymers. Thus, these polymers may be brittle or easily fractured when at room temperature or lower temperatures. Notably, however, many of these polymers retain their transparency and their shape under adverse conditions. Suitable polymers include thermoplastic or thermosetting materials, as desired. The polymer forming the retroreflective surface preferably is substantially optically clear, though it may be colored as desired. These polymers are often selected for one or more of the following reasons: thermal stability, dimensional stability, environmental stability, clarity, excellent release from the tooling or mold, and capability of receiving a reflective coating.

Suitable microstructured surfaces comprise, for example, cube corner elements that can be of various geometric designs. The retroreflective elements may also be called cube corners, prisms, microprisms, or triple mirrors, which for the purposes of this application are all equivalent terms. The basic cube corner retroreflective element is generally a tetrahedral structure having, for example, a base triangle and three mutually substantially perpendicular optical faces that cooperate to retroreflect incident light. The optical faces preferably intersect at an apex, with the base triangle lying opposite the apex. Each cube corner element also has an optical axis, which is the axis that extends through the cube corner apex and trisects the internal space of the cube corner element. Light incident on the first major viewing surface enters the base triangle and is transmitted into the internal space of the cube, is reflected from each of the three optical faces, and is redirected back in the same general direction as the incoming incident light. It is optional whether the faces of the cubes are exposed to an air interface or coated with a reflective coating, such as aluminum. FIG. 5a illustrates a microstructured surface that is spectrally coated with metal or other suitable reflective coatings as a means for altering the optical performance of the retroreflective member. In this embodiment, an optional sealing member (not shown) may be in complete contact with the microstructured surface without loss in retroreflection.

The height of the cube corner elements, defined as the length of the optical axis, is preferably as small as manufacturable for ease of sealing but may be as large as necessary while recognizing the desirability of avoiding waste of material and of increasing the thickness of the article. The minimum height is preferably about 0.01 mm and the maximum height is preferably less than 1 mm. The height of the cube elements is more preferably 0.02 mm to 0.5 mm. This microstructured surface is molded to yield a cube layer using any of a variety of techniques known to those skilled in the art.

Figure 5B:
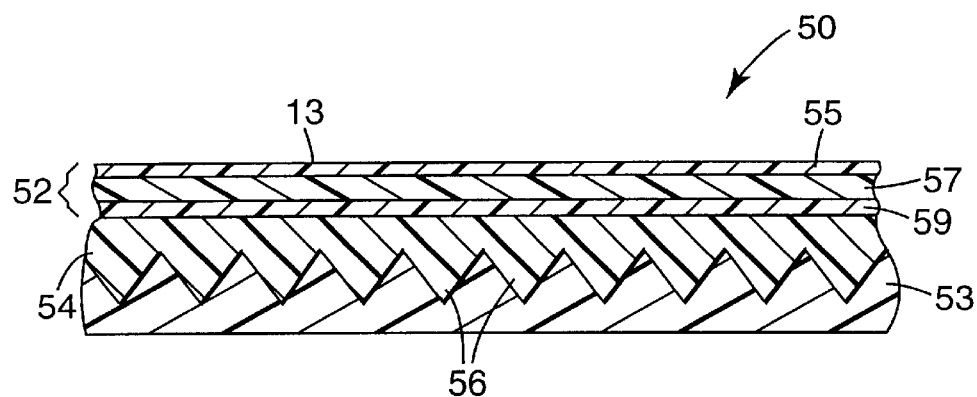
FIG. 5b is a cross-sectional view of an enclosed prismatic-type retroreflective article.

FIG. 5b illustrates an enclosed prismatic-type retroreflective article 50 having a face member 52 with a major viewing surface 13, and a retroreflective member 54. The retroreflective member has a first major surface in contact with the face member and a second opposing microstructured surface having retroreflective elements 56, such as prisms, with a reflective coating thereon. An underlying layer 53 lies against the reflective coating, thereby enclosing the prisms. The face member preferably comprises a transparent multilayer film, as previously discussed for FIG. 5a.

Figure 6:
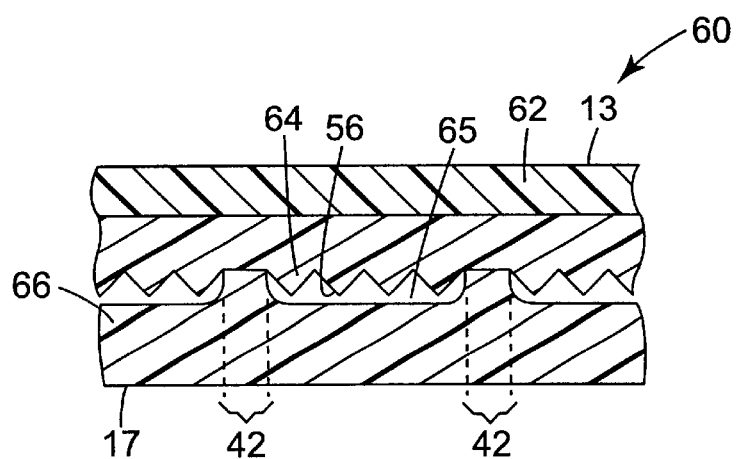
FIG. 6 is a cross-sectional view of an encapsulated prismatic-type retroreflective article.

FIG. 6 illustrates a cross-sectional view of an encapsulated prismatic-type retroreflective article 60 having a face member 62 with major viewing surface 13, retroreflective member 64 with retroreflective elements 56 forming a microstructured surface, and sealing member 66 having a major surface 17. The sealing member 66 is bonded to the microstructured surface or to the retroreflective member 64 to form seal legs (42 in FIG. 6). The microstructured surface, the sealing member, and the seal legs form a plurality of encapsulated air cells 65.

Multilayered films of the present invention may be used for the face member or the sealing member. Suitable multilayer films for the face member were discussed previously in FIG. 5.

Typically, the seal legs have a height sufficient to provide an air interface for the unbonded portion of the microstructured surface. The width of the seal legs suitably may vary between about 0.2 mm to 4 mm, preferably between about 0.4 mm to 1 mm, and most preferably is at a width sufficiently narrow to maximize retroreflectivity while maintaining a satisfactory bonding strength of the sealing member to the microstructured surface. The seal legs may be formed by application of heat and pressure to the retroreflective member and the sealing member as disclosed in U.S. Pat. No. 3,190,178 (McKenzie).

The thickness of the sealing member is sufficient to protect the microstructured surface from exposure to factors, such as dirt and water that lower their optical efficiency and to bond the article to a substrate. The thickness of the sealing member is preferably at least 0.02 mm, more preferably at least 0.06 mm, but generally the thickness does not exceed about 0.3 mm.

The seal legs typically form a sealing pattern on the viewing surface of the face member. Patterns, such as hexagonal, rectangular, square, circular, hexagonal, or chain link, may be employed as desired. The seal legs do not retroreflect as much light as the area within the cells, which results in the pattern on the viewing surface. Typically, each individually sealed air cell has length and width dimensions A and B. Dimension A and B preferably range from about 4 mm to about 50 mm. Dimensions A and B determine the area of each cell on the viewing surface. The area of the cells is preferably small. For example, the surface area of each cell is less than 5 square centimeters, preferably less than 4 centimeters, more preferably less than 1 square centimeters, and most preferably less than 0.5 square centimeters, although area may vary from cell to cell. Dimensions of a cell may be measured using a metric ruler and the area of a cell calculated by formulas known to those skilled in the art.

Some illustrative examples of materials for the sealing member include thermoplastic, heat-activated, ultraviolet cured, and electron beam cured polymer systems. Preferably, the Vicat softening temperature of the sealing member is at least about 30° C. less than that of the microstructured surface.

If desired, the sealing member may comprise a multilayer film. One illustrative example includes a first layer capable of bonding to the microstructured layer of the retroreflective member; a second inexpensive core layer; and a third layer capable of bonding to a backing member or suitable substrate. The first layer of the sealing film may be polyurethane, the core layer may be an alkylene copolymer (e.g., EVA or modified EVA) such as Bynel 3860, and the third layer may be polyurethane or an ethylene-acrylic-acid copolymer (EAA). Most preferably, the sealing member includes an opacifier (e.g., a titania opacifier).

Figure 7:
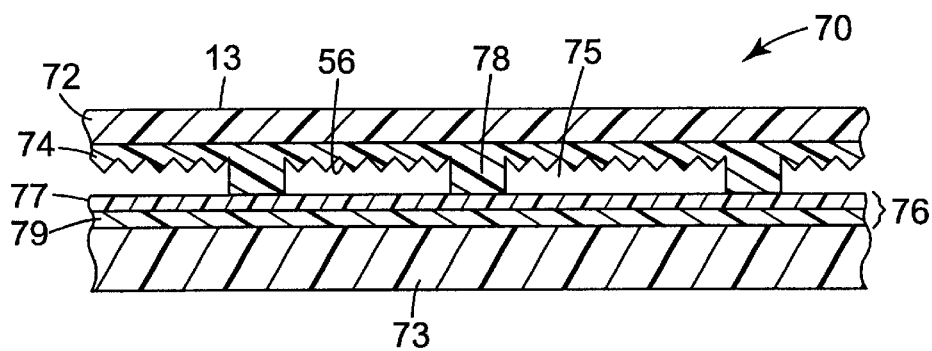
FIG. 7 is a cross-sectional view of an encapsulated prismatic-type retroreflective article having a raised-ridge.

FIG. 7 illustrates a cross-sectional view of a raised-ridge prismatic-type retroreflective article 70 having a pattern of raised ridges 78 with retroreflective elements 56 forming a microstructured surface on the retroreflective member 74. A face member 72 has a major viewing surface 13. A sealing member 76 is bonded to the raised ridges 78 on the retroreflective member. The microstructured surface, the sealing member, and the raised ridges form a plurality of encapsulated air cells 75, with the retroreflective member in spaced relation to the sealing member. The prisms have air exposed faces within the plurality of cells. The raised ridges on the microstructured layer may be thermally or ultrasonically laminated to the sealing member to form a sealing pattern. The sealing pattern may comprise individual cells each having a small area on the viewing surface.

Multilayered films of the present invention may be used for the face member or the sealing member. Suitable multilayer films for the face member were discussed previously in FIG. 5. The sealing member 76 preferably comprises a multilayer film (e.g., a film having at least one polyurethane layer 77 and at least one alkylene copolymer layer (e.g., an EVA layer) 79). If desired, the multilayer film may include or be attached to an optional relatively thick (e.g. 1 to 10 mm) polymeric substrate 73. Preferred such substrates are relatively rigid and have high impact strength (e.g., high density polyethylene, acrylonitrile-butadiene-styrene, polycarbonate (PC), impact modified PMMA, or PP). The substrate may be filled, e.g., with titania. This article is particularly useful for license plates and highway signs. Alternatively, the multilayered film may include at least one polyurethane layer 77, at least one ethylene copolymer layer (e.g., an EVA layer) 79, and a layer of a suitable adhesive material (e.g., a pressure sensitive adhesive or a layer of EAA). The retroreflective article of this embodiment may then be adhered to a suitable substrate (e.g., an aluminum sheet).

In many applications, the retroreflective article having multilayer film(s) is mounted via an adhesive to a rigid substrate, such as an aluminum plate for a highway sign or for a license plate, or to a highway surface, such as concrete or asphalt. An especially useful alternative application for a retroreflective article having multilayer film(s) is as a roll-up sign.

Figure 8:
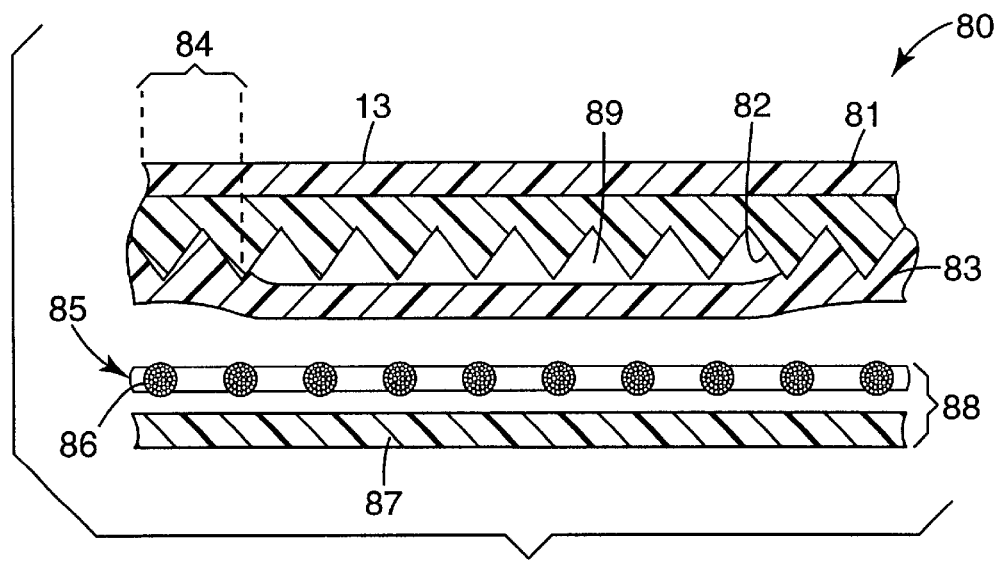
FIG. 8 is an exploded cross-sectional view of a roll-up sign article.

As illustrated in FIG. 8, the flexible retroreflective article 80 having multilayer film(s) is mounted on a flexible scrim-reinforced backing member 88. Defects may result when attempting to bond a retroreflective sheeting to a flexible scrim reinforced backing member. One defect that degrades both the appearance and the brightness of the retroreflective article is a "scrim pattern" or lines on the viewing surface of the retroreflective sheeting because the scrim in the backing protrudes into the sheeting. Another defect is poor strength because the scrim protrudes from the backing and thus is exposed to weathering and abuse during handling. Another defect is delamination because the retroreflective sheeting is bonded to only a portion of the backing member. Flexible retroreflective articles are needed that do not have these defects. Thus, there are unmet needs for flexible retroreflective articles that preferably can be produced without the undesirable scrim pattern on their viewing surface; that do not degrade in retroreflectivity during normal use; and that maintain flexibility and adherence of the retroreflective sheeting to the backing member with time.

As illustrated in FIG. 8, flexible retroreflective article 80 (e.g., a roll up sign) includes face member 81, retroreflective member 82, sealing member 83, and backing member 88. In one preferred embodiment, sealing member 83 forms seal legs 84 with retroreflective member 82 and defines air cells 89. Backing member 88 includes scrim 85 (including multifilament strands 86) and backing layer 87. Suitably, backing layer 87 and sealing member 83 encapsulate scrim 85.

It has been discovered that improved flexible retroreflective articles (e.g., roll up signs) may be fabricated with the multilayered films of the present invention. The multilayered films, for example, can be used to form one or more of the face member, the sealing member, and the backing layer.

For example, a suitable multilayer film for use as a face member includes the face member films described in connection with FIGS. 5 and 6. Suitable multilayer film for use as a sealing member includes the sealing member films described in connection with FIG. 6.

The backing layer preferably is selected to achieve the desired performance with the sealing member to which it is bonded. In this regard, one preferred combination of sealing member and backing layer includes the following layers: The sealing member can comprise a multilayer film including a first layer of polyurethane, a core layer of an alkylene copolymer and an optional underlying layer of EAA. Preferably the sealing member is pigmented white or is otherwise opaque. The backing layer can comprise a multilayer film including a urethane layer, a core layer of an alkylene copolymer and an underlying layer of a suitable polymer (e.g., EAA or polyurethane). When the sealing member and backing layer are laminated together (as will be further described) they function to encapsulate the scrim.

Figure 9A:
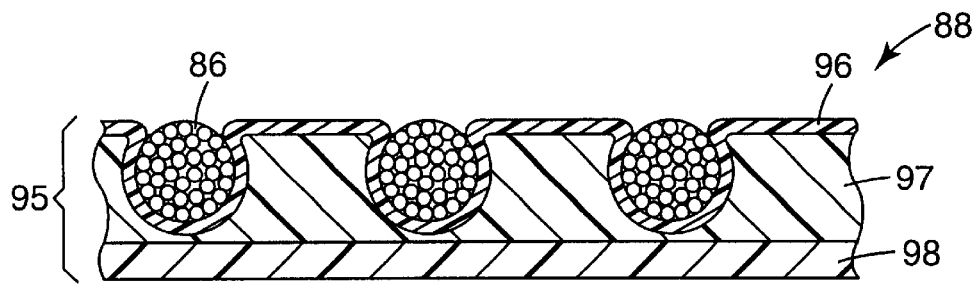
FIG. 9a is a cross-sectional view of a backing member of a roll-up sign article.

As illustrated in FIG. 9a, a preferred embodiment is to use a multilayer film in the backing member. A suitable backing member 88 has (1) a reinforcing scrim having a plurality of multifilament strands 86, and (2) a multilayer film 95 having a bonding layer 96 of a polymer capable of bonding to a sealing member (not shown), a core layer 97 of a polymer capable of encapsulating or partially encapsulating the strands, and an optional underlying layer 98 of a polymer capable of forming a weatherable layer. The thickness of the multilayer film is preferably the same or greater than that of the scrim to avoid exposure of the scrim.

The multilayer films enable lower lamination temperatures or pressures that preferably avoid the undesirable scrim pattern on some retroreflective articles and yet protect the scrim from degradation during handling or from exposure to the weather. The multilayer films may also enable processing conditions that preferably provide partial encapsulation of the strands without separately bonding each of the individual filaments in the strand together, thereby improving flexibility of some retroreflective articles.

While not intending to be bound by theory, the bonding layer preferably serves to bond the backing member to the sealing member at a low lamination temperature and low nip pressure. The low temperature and nip pressure preferably results in the strands of the scrim being partially encapsulated rather than impregnated by the multilayer film. Moreover the low temperature and nip pressure preferably avoids polymer from being forced into the microstructured surface for retention of brightness and for avoiding an undesirable scrim pattern on the viewing surface of the retroreflective article.

The bonding layer preferably comprises a urethane polymer. Suitable such materials were discussed with regard to layer 12a of FIG. 1a. A particularly useful bonding layer comprises polyurethane. A specific bonding layer found useful for this invention is the above-mentioned polyurethane Q-THANE QC4820. Many other polyurethanes (for example, those previously discussed with regards to FIGS. 1a and 1b) may also be utilized. The thickness of the bonding layer is preferably kept thin (see, e.g., the discussion regarding the thickness of layer 12a of FIG. 1a). Typically, the bonding layer is about 0.003 mm, but may be more or less as necessary to achieve its function.

The core layer preferably comprises an alkylene copolymer. Suitable such materials were discussed with regard to layer 14a of FIG. 1a. Selection of a suitable polymer for the core layer generally requires a balance between achieving bonding between layers and retaining flexibility, especially in cold weather. The core layer also functions as an easy flow layer to partially melt-encapsulate the scrim. In one embodiment, the core layer also functions as a barrier to plasticizer migration from plasticized PVC coatings. The core layer also adheres the bonding layer to an optional weatherable layer. The core layer may also provide cold temperature flexibility.

One specific embodiment of a core layer uses BYNEL adhesive resins, e.g., series 3100, which are acid- and acrylate-modified EVA resins. In general, flexibility may be increased by increasing the vinyl acetate content, whereas lamination peel strength may be increased by lowering the acid content, preferably by lowering the acid content to less that one percent. Partial encapsulation of the scrim by the multilayer film may be difficult when the core layer has more than approximately 30 percent vinyl acetate content. For this use, preferred core layers have a melt index in a range between about 3 and 10, with the lower number corresponding to the higher molecular weight polymers.

An example of a suitable polymer capable of partially encapsulating the strands of a typical scrim is BYNEL 3101 acid/acrylate-modified EVA. Other suitable polymers include BYNEL Series 3800 anhydride-modified EVA polymers, which preferably have an acid content of less than 1 percent. For example, BYNEL 3860 anhydride-modified EVA is a suitable core layer.

It is preferred that the core layer be capable of being formed by extrusion because this is the preferred process for making the multilayer films. As examples, the BYNEL resins cited above are extrudable.

Suitable materials for the optional weatherable layer include polymers capable of withstanding outdoor exposure. Preferred polymers also provide light opacity and resistance to dirt and solvents, such as gasoline. One preferred method of making the backing member includes the use of a hot can or roll. In such methods, the weatherable layer should resist heat when placed on the hot can roll surface. In addition, some heat resistance by the weatherable layer may also be required for specific applications, such as being rolled up in the hot summer sun.

An illustrative example of a suitable polymer useful as an optional weatherable layer is EAA available under the trade designation PRIMACOR 3440, from Dow Chemical Company, Midland Mich. This includes about 9 percent acrylic acid as a percentage of the total weight of ethylene and acrylic acid monomer. This copolymer has a melt index of about 10.

The scrim imparts great tear strength and tensile strength to the retroreflective article in accordance with the invention while maintaining flexibility of the retroreflective article. While not intending to be bound by theory, this flexibility is believed to result from the scrim not being strongly bonded within the backing member. The scrim may be such that it will bond to the sealing member or to a multilayer film. However, preferred scrims will at most only weakly melt-bond or substantially will not melt-bond thereto.

Figure 9B:
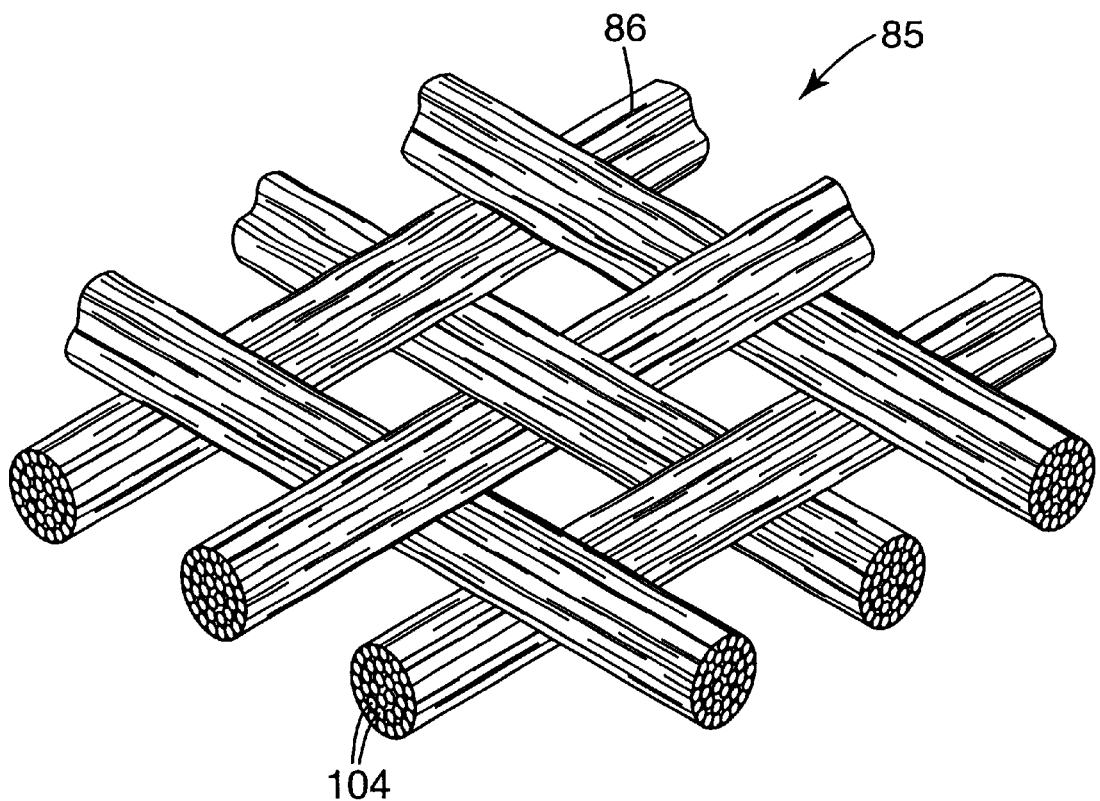
FIG. 9b is a perspective view of a scrim of the backing member of FIG. 8.
Figure 10:
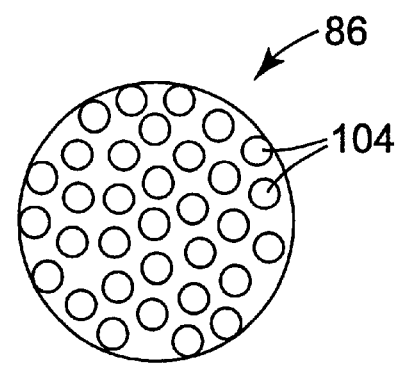
FIG. 10 is a cross-sectional view of tightly packed filaments in one strand of a scrim.

As seen in FIGS. 9b and 10, the scrim 85 in the backing member is made up a plurality of multifilament strands 86. Each strand includes a plurality of filaments 104 that may be entwined or twisted together or not, as desired. The filaments 104 in a strand 86 may be of substantially equal cross sectional diameter or varying diameter, as desired. The various strands in a given scrim may be substantially uniform or different in diameter, number of filaments, length, and composition of filaments, as desired. The diameters of the strands may vary from about 0.1 mm to 0.5 mm. Thus, the thickness of the scrim may be approximately 0.25 mm, but thickness of the scrim may vary depending on use. In general, increasing the thickness of the scrim results in increasing the strength of the backing member, although flexibility of the backing member may also be decreased.

FIG. 10 depicts a cross-section of a strand 86 having a circular shape with filaments 104. The strands 86 preferably comprise at least 7 filaments, more preferably 15 or more filaments, and still more preferably about 30 or more filaments.

Preferably, the strands are partially encapsulated, encapsulated, or surrounded by polymer. The term "partial encapsulation" refers to the ability of a polymer to surround portions of the strands while leaving air spaces also adjacent to the strands. Most preferably, at least some of the filaments within a strand are free to move with respect to one another.

Preferably, the filaments are not wound together tightly or bonded together, and the interstices within the strands are not saturated with polymer. Thus, there may be independent movement of each filament within a strand, and this movement is believed to provide improved flexibility. Retention of the circular shape of the strand in the article indicates that proper lamination temperature/pressure conditions are used in forming the backing member (e.g., undesirable bonding of filaments with polymer has been avoided).

Illustrative examples of suitable scrims for use in or as backing members herein include woven, non-woven and knitted fabrics, and webs of loose fibers, all of which may include various polymers, such as one or more of polyamide, polyester, and cellulosic. Illustrative examples of scrims are disclosed in U.S. Pat. No. 3,403,862 (Dworjanyn); U.S. Pat. No. 5,405,643 (Scholz); and U.S. Pat. No. 5,498,232 (Scholz). Scrims are available from manufacturers such as DuPont Nonwovens (e.g., under the designation SONTARA); Milliken Co.; and Apex Mills Corporation.

Figure 11:
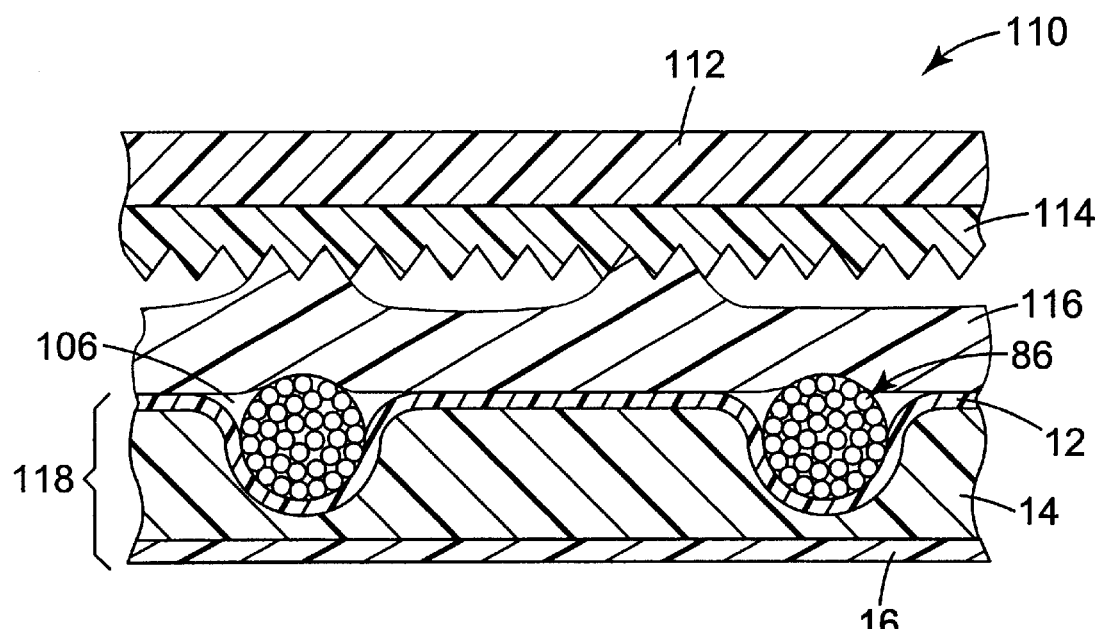
FIG. 11 is a cross-sectional view of a flexible retroreflective article made by bonding the backing member of FIG. 8 to the encapsulated prismatic-type retroreflective article of FIG. 6.

FIG. 11 illustrates a cross-sectional view of a retroreflective article 110 that can be made by laminating the retroreflective article depicted in FIG. 6 to the backing member depicted in FIG. 9a. As shown in FIG. 11, article 110 has face member 112 and retroreflective member 114. A sealing member 116 is bonded to portions of the retroreflective member 114 and to portions of backing member having strands 86 partially encapsulated by a multilayer film 118.

Figure 12:
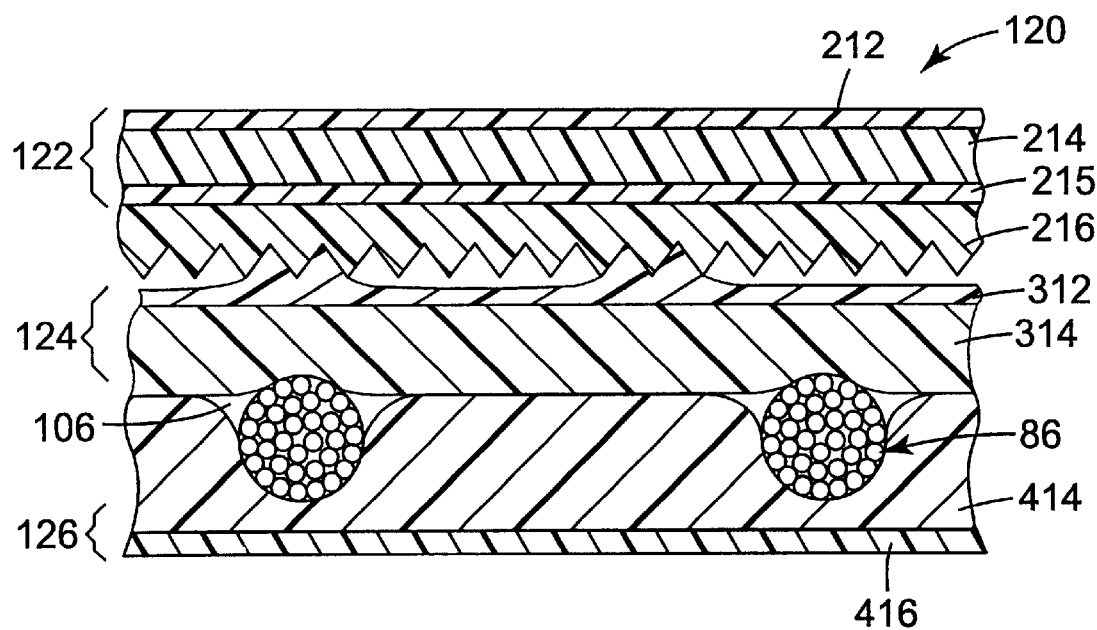
FIG. 12 is a cross-sectional view of one preferred embodiment of a flexible retroreflective article.

FIG. 12 is a cross-sectional view of another embodiment of a retroreflective article 120. The face member has a multilayer film 122 having an air-exposed layer 212, a core layer 214 and an underlying layer 215. The retroreflective member has microstructured layer 216. The underlying layer of the retroreflective member bonds to the core layer of the face member. A sealing member 124 has a multilayer film having a bonding layer 312 capable of bonding to the microstructured layer and a core layer 314 capable of bonding to the backing member. The backing member has a scrim with strands 86 and a multilayer film layer 126. The multilayer film 126 has a core layer 414 with a weatherable layer 416 laminated thereto. The core layer of the sealing member may have the same polymer as the core layer of the multilayer film 126.

Figure 13:
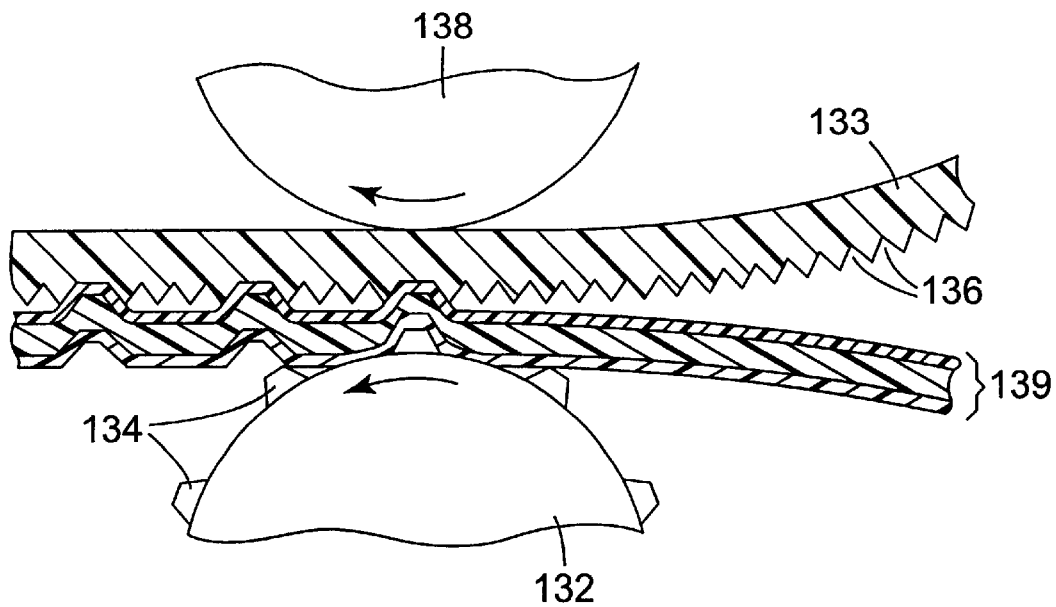
FIG. 13 is a side view of a lamination process useful for making an encapsulated prismatic-type retroreflective article.

FIG. 13 illustrates one method for making flexible retroreflective articles having multilayer film 139 by thermal lamination. In a typical thermal/mechanical method of forming the seal legs shown in FIG. 6, the temperature of an embossing roll 132 is preferably hot enough to thermally bond the sealing member to the retroreflective member. The patterned protrusions 134 on the embossing roll force the sealing member into depressions 136 on the microstructured surface of the retroreflective member 133 to form the seal legs. The opposing roll 138 may be smooth and near ambient temperature. In addition to thermoforming techniques, other techniques, such as ultrasonic welding, radio frequency welding, thermal fusion, and reactive welding, may be used.

Figure 14:
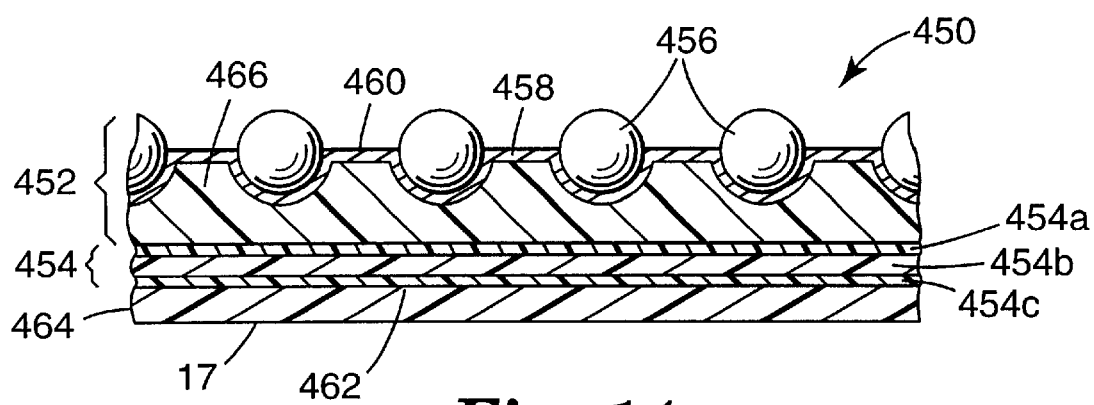
FIG. 14 is a cross-sectional view of another exposed lens retroreflective article.

FIG. 14 depicts an exposed lens retroreflective article 450 having retroreflective member 452 carried by a multilayer film 454. The relative thicknesses of the individual layers shown in the figure are not to scale. Further, glass beads 456—which cooperate with a continuous reflective coating 458 to form retroreflective elements—are typically spaced closer together than depicted in FIG. 14. The article 450 has a front surface 460 for viewing and a back surface 462, which can be used for attachment to other articles as desired. A removable layer 464 is shown temporarily attached to back surface 462.

A similar apparatus (but without the patterned protrusions) may be used to laminate retroreflective sheeting to a backing member to make a flexible retroreflective article, such as a roll-up sign. Several preferred methods involving sequential lamination steps will now be described for making such signs, it being understood that these methods can also be used (with suitable modification as needed) to make other articles of the invention.

In a first preferred method for making a roll-up sign, a retroreflective article having a sealing member (e.g., article 60 with sealing member 66 depicted in FIG. 6) is thermally bonded in a first lamination step to an intermediate multilayer film (e.g., bilayer film 10a depicted in FIG. 1a) with a scrim (e.g., scrim 86 depicted in FIG. 9a) sandwiched therebetween. The intermediate multilayer film has a bonding layer on a core layer. In this first lamination step, the bonding layer of the intermediate film adheres to the sealing member and places the core layer of the intermediate film in an exposed position for a second lamination step. In the second lamination step, the exposed core layer of the intermediate film is bonded to a weatherable layer (e.g., film 16b depicted in FIG. 1b) to form the roll-up sign (e.g., article 110 depicted in FIG. 11). As previously mentioned, one way that has been discovered to keep the completed roll-up sign more flexible involves using minimum temperature and pressure in the first lamination step, so that the scrim only adheres to the sealing member rather than sinking into it. It has also been discovered that temperature and pressure control in the second lamination step are useful. Excessive temperature and pressure in the second lamination step can result in the scrim pushing polymer into the microstructured surface. When polymer contacts the microstructured surface, this condition results in a "white out" appearance, a reduction in brightness of the sign and a scrim pattern that can be seen through the viewing surface of the sign. Preferred lamination conditions, such as temperatures and pressures, are somewhat specific to the materials chosen for the retroreflective article. However, proper lamination conditions can be easily determined by those skilled in the art following the teachings herein. Some useful lamination conditions are described later in the examples.

In a second preferred method for making a roll-up sign, the components mentioned in the above paragraph are assembled using three lamination steps rather than two steps. The multilayer film is laminated to the scrim in a first lamination step. In this first lamination step, the core layer and its bonding layer preferably partially encapsulate the scrim, leaving a substantial portion of the bonding layer exposed between the strands of the scrim. In a second lamination step, the retroreflective article is thermally bonded to the exposed bonding area of the multilayer film. The carrier film is then removed from the multilayer film side of the resulting assembly to expose the core layer. In a third lamination step, the freshly exposed core layer is bonded to the weatherable layer. As with the method described in the prior paragraph, control of lamination temperature and pressure should be maintained, especially in the second and third lamination steps, so that the scrim pattern is not seen through the viewing surface of the competed roll-up sign.

In a third preferred method for making a roll-up sign, the same components are assembled using three lamination steps, but carried out in a different order than that used for the second preferred method. In a first lamination step, the multilayer film is laminated to the scrim. The core layer and its bonding layer preferably partially encapsulate the scrim, leaving a substantial portion of the bonding layer exposed between the strands of the scrim. The carrier film is then removed to expose the core layer. In a second lamination step, the freshly exposed core layer is bonded to the weatherable layer. In a third lamination step, the retroreflective article is thermally bonded to the exposed bonding area of the multilayer film to form the roll-up sign. Again, control of temperature and pressure should be maintained so that the scrim pattern is not seen through the viewing surface of the competed roll-up sign.

An advantage of the invention is that the retroreflective article has a sealing member that may be first bonded to the retroreflective member in a desired sealing pattern, taking into account possible effects of the sealing pattern on the desired appearance of the member from the front surface and on the desired retroreflective performance of the resultant article. Then the article may be bonded to the backing member without substantially disturbing the sealing pattern on the viewing surface of the article. The resultant retroreflective article may have a sealing pattern with each cell having a small surface area. This method permits separate optimization of each interface and of the final product, while the sealing member is substantially completely bonded to the backing member over substantially its entire surface to provide a strong cohesive interfacial bond. An advantage of the present invention is that articles of the invention can be constructed so as to maintain an excellent degree of flexibility without any cracking or mechanical failure. For example, the articles may be wrapped around curved or otherwise non-planar surfaces without damage. In one test, this flexibility was measured by wrapping the retroreflective article around a cylindrical mandrel having a 3.2 mm diameter, with the test performed at 0° C.

Those skilled in the art will optimize the line speed, nip force and other lamination conditions (e.g., hot can temperature) to obtain the desired properties in finished laminated retroreflective articles of the invention. Usually, this will involve attaining a balance among interlayer bond strength, visibility of the scrim pattern from the retroreflective viewing side of the finished retroreflective article, and flexibility of the finished article.

Articles comprising the multilayer films of the present invention have utility for numerous applications, such as a portion of a road sign, a roll-up sign, a license plate, vehicle conspicuity sheeting, an article of clothing (e.g., a warning vest), footwear (e.g., running shoes), an accessory bag, a backpack, a protective cover, a sheet, a tarpaulin (e.g., a truck trailer cover), a warning tape, pavement marking article, a decorative webbing, a structural webbing, or tapes, piping, patches and emblems for attachment to such items.

All of the polymers, scrim, and various members of the retroreflective article may include adjuvants for various purposes. Colorants, UV absorbers, fluorescent compounds, light stabilizers, free radical scavengers or antioxidants, processing aids such as antiblocking agents, releasing agents, lubricants, additives to improve weathering and heat stability, and other additives may be added to the various polymers or materials as desired.

The particular colorant (e.g., dyes and pigments, optionally fluorescent) selected, of course, depends on the desired color. Colorants typically are added at about 0.01 to 1 weight percent.

UV absorbers typically are added at about 0.5 to 2 weight percent. Illustrative examples of UV absorbers include derivatives of benzotriazole such as those available under the trade designations TINUVIN 327, 328, 900, 1130, and TINUVIN-P from Ciba-Geigy Corp.; chemical derivatives of benzophenone such as those available under the trade designations UVINUL M40, 408 and D-50 from BASF Corp.; those available under the trade designations SYN-TASE 230, 800, and 1200 from Neville-Synthese Organics, Inc.; or chemical derivatives of diphenylacrylate such as those available under the trade designations UVINUL N35 and 539 from BASF Corp.

Light stabilizers that may be used include hindered amines, which are typically used at about 0.1 to 2 weight percent. Illustrative examples of hindered amine light stabilizers include those available under the trade designations TINUVIN-144, 292, 622, 770, and CHIMASSORB 944 from Ciba-Geigy Corp.

Free radical scavengers or antioxidants may be used, typically, at about 0.01 to 0.5 weight percent. Illustrative examples of suitable antioxidants include hindered phenolic resins such as those available under the trade designations IRGANOX 1010, 1076, 1035, and MD-1024, and IRGAFOS 168 from Ciba-Geigy Corp.

Small amounts of other processing aids, typically no more than one percent by weight of the polymer resins, may be added to improve the resin's processability. Useful processing aids include fatty acid esters, or fatty acid amides available from Glyco Inc.; metallic stearates available from Henkel Corp.; and the processing aid available under the trade designation WAX E from Hoechst Celanese Corp. Preferred polyurethane polymers may already contain processing aids such as waxes, oils, and release agents for use in extrusion processes. Anti-sticking powders, such as talc, fumed silica, clay, and calcium carbonate may also be used to aid in extrusion processes.

EXAMPLES

Features and advantages of this invention are further explained in the following illustrative examples. All parts and percentages herein are by weight unless otherwise specified; "gsm" designates grams per square meter. The constructions cited were evaluated by tests as follows:

Retroreflective Brightness Test

The coefficient of retroreflection $R_A$ is measured in accordance with standardized test ASTM D4956-95 and ASTM E810-94. RA values are expressed in candelas per lux per square meter (cd/lux/m$^2$). The entrance angle is the angle between an illumination axis from a light source and a retroreflector axis normal to the surface of the retroreflective article. The entrance angle was selected to be −4 degrees. The observation angle is the angle between the illumination axis from the light source and the observation axis. The observation angle was chosen to be 0.2 degrees. The reported coefficient of retroreflection is an average of the values measured at sample orientations of 0 and 90 degrees.

Flexibility Test

Flexibility was measured by wrapping the retroreflective article around a cylindrical mandrel having a 3.2 mm diameter. The test was performed at 0° C.

X-Cut Tape Peel Test

Lamination strength between the layers of the multilayer film was measured by using test method A of ASTM D3359.

Z-Peel Test

The tensile bond Z-peel test is based on ASTM D952-95. The specimen to be tested is attached between two metal fixtures. The test was set up using an upper fixture that was a cubic block of steel 25.4 mm on each edge presenting a 6.5 square centimeter surface and a lower fixture that was a 1.6 mm thick plate of aluminum 5×30.5 cm. A 30 mm square piece of retroreflective sheeting was covered on the top with a layer of a suitable pressure sensitive tape, such as SCOTCH™ Adhesive Tape No. 419 available from 3M, and on the bottom with a pressure sensitive adhesive having a 93:7 ratio of isooctyl acrylate-acrylic acid copolymer crosslinked with a bisamide crosslinker, such as disclosed in U.S. Pat. No. 4,418,120 (Kealy) with an intrinsic viscosity of 1.5 to 1.7 as measured by modified Ostwald 50 viscometer at 20° C. using ASTM D446-97 test method (the "93:7 adhesive"). The No. 419 adhesive tape was conditioned by storing in a desiccator containing calcium carbonate for at least 24 hours prior to use. The sheeting was placed, back side down on the center of the aluminum plate with the steel block on the top side of the sheeting. The sheeting was trimmed around the edges of the upper steel block so that a 25.4 by 25.4 square of the sample was tested. The assembled laminate was compressed with a force of 1900 newtons for one minute. The steel cube was secured in the upper jaw of a standard tensile testing machine and the aluminum plate was secured along two sides in a lower gripping fixture of the tester. The jaws were rapidly separated at 50 cm/minute and the force versus displacement curve recorded and the peak load in kilograms was reported.

Vicat Softening Point Test

The Vicat Softening Point of the indicated materials is determined according to ASTM D1525-97.

Melt Index Test

The melt index of the indicated materials is determined according to Condition 190/2.16 and the procedure given in ASTM D1238-95.

SLS Test—(Peel Test After Soaking in Sodium Lauryl Sulfate-Water Solution)

A test specimen is prepared by adhering a 5.1 centimeter wide by 7.6 centimeter long piece of retroreflective sheeting onto a 7 centimeter wide by 28 centimeter long piece of aluminum. The specimen is soaked in a one weight percent solution of sodium lauryl sulfate in water at 55° C. for 24 hours. The specimen is then wiped clean and dried with a paper towel and tested for adhesion between the different layers of the sheeting. To do this, a horizontal cut is made across the sheeting approximately 2.5 centimeters from one end of the sample. A sharp instrument is then used to pick at the sheeting until one of the layers separates from another layer. The ease of separating a layer is then rated on a scale of 1 being OK and 4 being unacceptable. For example, if the face member cannot be separated from the retroreflective member, then the rating is 1. On the other hand, if the face member can be completely separated from the retroreflective member, then the rating is 4.

Example 1

A Trilayer Film

Extruders A, B, and C were used to co-extrude simultaneously a 0.005 mm thick layer of polyurethane, a 0.005 mm thick layer of EVA (BYNEL 3860, available from DuPont), and a 0.025 mm thick layer of EAA, respectively. These three polymers were in pellet form as fed into the feed hopper, with the polyurethane pellets having been previously dried. All three extruders used a screw with compression ratio of 3:1. The temperature profiles from the hopper end to the discharge die end were 170 to 195° C. for extruder A, 170 to 205° C. for extruder B, and 170 to 215° C. for extruder C. The 40 cm wide feed block die was used to produce a uniform web width of 29 cm with acceptable trilayer film made at line speeds between 6 and 9 meters per minute.

Delamination of the layers was not found using the X-cut tape test.

Example 2

A Trilayer Film for a Retroreflective Pavement Marking Article

An enclosed beaded lens retroreflective sheeting, as disclosed in U.S. Pat. No. 4,663,213 (Bailey), is made with a face member of trilayer film as described in Example 1, except the air exposed layer is 0.006 mm thick polyurethane, the core layer is 0.06 mm thick EVA (BYNEL 3860, available from DuPont), and the underlying layer is 0.006 mm thick polyurethane. This retroreflective article having a trilayer face member is bonded via an adhesive to a road surface to form a pavement marking.

Example 3

A Trilayer Film in Retroreflective Canvas Reflective Graphics

An elastomeric enclosed beaded lens retroreflective sheeting, as disclosed in U.S. Pat. No. 4,950,525 (Bailey), is made with a multilayer film as prepared in Example 1, with exceptions as follows: Glass beads are pressed or sunk into a 0.04 mm thick layer of EAA and a reflective coating placed in a cooperative position with respect to the beads to form a retroreflective member. The face member is a three layer film having an air exposed layer of 0.005 mm thick polyurethane, a core layer of 0.005 mm thick EVA (BYNEL 3860 available from DuPont), and an underlying layer of 0.04 mm thick EAA. This retroreflective article having a trilayer film may be adhesively bonded to a canvas cover for use on trucks and other vehicles.

Example 4

A Multilayer Film as a Face Member for a License Plate

An enclosed beaded lens retroreflective sheeting was provided as SCOTCHLITE™ License Plate Sheeting Series 3750, available from 3M. The first major surface of the sheeting may be optionally primed with approximately a 0.003 mm thick layer of a water borne aliphatic polyurethane available from ICI RESINS under the trade designation NEOREZ R-960.

A multilayer film was prepared by simultaneously extruding a face member having an air-exposed layer of polyurethane, a core layer of EVA, and a bonding layer of EAA, onto a polyethylene terephthalate ("PET") carrier, with the polyurethane layer in contact with the carrier. The polyurethane layer was a 0.005 mm thick layer of polyester based aliphatic urethane designated L430.77, available from Rohm and Haas. The EVA core layer was a 0.005 mm thick layer of BYNEL 3860 resin available from DuPont. The EAA bonding layer was a 0.025 mm thick layer of PRIMACOR 3440 copolymer of ethylene with 9 weight percent acrylic acid and having a melt index of 10, available from Dow Chemical Company. The EAA side of the multilayer film was thermally laminated as a face member to the underlying layer on the 3750 sheeting. The PET carrier was then removed.

Delamination of the multilayer face member from the license plate retroreflective article was not found in the SLS test or in the X-cut tape test.

Comparative Example A

Same as Example 4, Except the EVA Core Layer Was Absent

A retroreflective sheeting was provided as SCOTCHLITE™ License Plate Sheeting Series primed 3750, available from 3M. The sheeting may be optionally primed with approximately a 0.0025 mm thick layer of water borne aliphatic polyurethane NEOREZ R-960.

A bilayer film was prepared as a face member by simultaneously extruding an air-exposed layer of polyurethane and a bonding layer of EAA onto a PET carrier, with the polyurethane layer in contact with the carrier. The polyurethane layer was a 0.005 mm thick layer of L430.77 polyester based aliphatic urethane. The EAA bonding layer was a 0.025 mm thick layer of PRIMACOR 3440 copolymer. The EAA side of the multilayer film was thermally laminated as a face member to the underlying layer on the 3750 sheeting. The PET carrier was then removed.

Delamination of the face member, specifically the polyurethane top layer from the EAA layer, was found in the SLS test.

Example 5

A Multilayer Film for a Thermal Print Receptive Retroreflective Article

An article such as shown in FIG. 3a may be made thermally print receptive by substituting a trilayer film for the face layer 33. A suitable multilayer film has a 0.005 mm thick polyurethane layer, a 0.005 mm thick core layer of EVA (BYNEL 3860), and a 0.025 mm (1 mil) thick EAA layer. This multilayer film is thermally laminated with the EAA layer as a bonding layer to the retroreflective member. This trilayer film of the present inventive article provides a smooth surface for printing or hot-stamping and print quality is improved.

Example 6

A Multilayer Sealing Member for a Raised-ridge Prismatic-type Retroreflective Article A raised-ridge prismatic-type retroreflective article, as illustrated in FIG. 7, was provided. The face member was a 0.05 mm thick single overlay of an impact modified PMMA. The retroreflective member was a 0.36 mm thick (including ridge height) single layer of polycarbonate having a microstructured layer containing both prisms and a pattern of raised ridges. The pattern of ridges was rectangular with sides having lengths of approximately 2 mm by 5 mm. Each ridge had a height of approximately 0.18 mm and a width of approximately 0.5 mm.

A multilayer film was used for the sealing member. The multilayer film had a bonding layer of 0.01 mm thick polyurethane, a 0.005 mm thick core layer of EVA (BYNEL 3860), and a 0.04 mm thick layer of EAA containing about 40 weight percent titania as a whitening/opacification agent. The multilayer sealing member was thermally laminated to the raised ridges on the microstructured layer of the retroreflective member, such that the polyurethane bonding layer contacted the pattern of raised ridges and the EAA layer was available for adhering to a suitable substrate. The lamination process was as illustrated in FIG. 13, except that both rolls were smooth with one roll heated to approximately 175° C. and the other roll at ambient temperature. The lamination pressure was approximately 1.1 kilograms per square centimeter and the web speed was approximately 1.5 meters per minute.

The result was acceptable lamination strength of the sealing member to the retroreflective member. In the Z-peel test, the peak load ranged from approximately 29 to 34 kilograms.

Example 7

A Multilayer Sealing Member for a Raised-ridge Prismatic-type Retroreflective Article A raised-ridge prismatic-type retroreflective article, as illustrated in FIG. 7, was provided. The face member was a 0.05 mm thick single overlay of an impact modified PMMA. The retroreflective member was a 0.36 mm thick (including ridge height) single layer of polycarbonate having a microstructured layer having both prisms and a pattern of raised ridges. The pattern of ridges was rectangular with sides having lengths of approximately 2 mm by 5 mm. Each ridge had a height of approximately 0.18 mm and a width of approximately 0.5 mm.

A multilayer film was used for the sealing member. The multilayer film included a bonding layer of 0.01 mm thick polyurethane and a 0.005 mm thick core layer of EVA (BYNEL 3860). The multilayer sealing member was thermally laminated to the raised ridges on the microstructured layer of the retroreflective member, such that the polyurethane bonding layer contacted the pattern of raised ridges and the EVA layer was available for adhering thermally to an HDPE substrate.

Example 8

Multilayer Sealing Member for a Raised Ridge Prismatic-type Retroreflective Article—Improved Process Conditions Samples were prepared as per Example 6, except the lamination conditions were changed to a hot roll temperature of approximately 130° C. and a web speed of approximately 6 meters per minute.

The result was acceptable lamination strength of the sealing member to the retroreflective member. In the Z-peel test, the peak load ranged from approximately 40 to 42 kilograms.

Example 9

A Multilayer Film as a Face Member for an Encapsulated Retroreflective Article A multilayer film is used as a face member for an encapsulated lens article, as illustrated in FIG. 4. The multilayer film had a 0.076 mm thick EAA PRIMACORE 3440 air exposed layer, a 0.005 mm thick EVA core layer (BYNEL 3860), and a 0.01 mm thick polyurethane underlying layer capable of bonding to the retroreflective member. The retroreflective member was a white titania opacified vinyl/urethane cushion coat that carried partially metallized glass beads.

Example 10

Roll-Up Sign Having a Multilayer Backing Member and a Scrim—2-Step Lamination A prismatic-type retroreflective sheeting was provided, designated as SCOTCHLITE DIAMOND GRADE™ Drum Wrap 3910 white, available from 3M. The sheeting has a 0.09 mm thick, transparent polyurethane overlayer; a 0.18 mm thick polycarbonate retroreflective member having a microstructured surface as described by U.S. Pat. No. 4,588,258 (Hoopman); and a 0.06 mm thick polyurethane sealing layer opacified with titania. Although the 3910 white sheeting normally also has an adhesive layer on the sealing member and a liner on the adhesive, for this example both the adhesive layer and the liner had been omitted.

A multilayer backing member was made as follows: A 0.075 mm thick core layer of modified EVA copolymer (BYNEL 3101) was extruded from a die at a die temperature of approximately 190° C. onto a 0.06 mm thick PET carrier. A 0.001 mm thick bonding layer of polyurethane solution (QC4820) was then coated onto the modified EVA core layer and allowed to dry to form a urethane primer layer on the core layer.

A roll-up sign containing a multilayer backing member and a scrim was assembled in two lamination steps. The scrim was an open weave polyester fibrous material approximately 0.25 mm thick containing 1000 denier fibers in a strand and 3.5 strands per cm in each direction, available from Milliken Co. In the first lamination step, the scrim was thermally laminated to the polyurethane sealing layer of the retroreflective sheeting and to the urethane primer layer of the multilayer backing member, in order to partially encapsulate the scrim. Lamination was carried out by running the multilayer backing member, scrim and retroreflective sheeting between two rollers at 1.5 meters/minute, with one roll being a metal hot can roll and the other roll being a rubber roll near ambient temperature. The PET carrier for the multilayer backing member was placed against the metal hot can roll. The transparent polyurethane overlay for the retroreflective sheeting was placed against the rubber roll. The scrim was fed into the lamination nip between these two webs. For this first lamination step, the lamination temperature was approximately 115° C. and the lamination nip force or pressure was approximately 280 newtons/cm of laminator nip width. During lamination, the urethane primer layer of the multilayer backing member flowed through the openings in the scrim and contacted the polyurethane sealing layer of the retroreflective sheeting, thereby forming a firm bond that partially encapsulated the scrim. The PET carrier was removed from the multilayer backing member side of the resulting laminated assembly, thereby exposing a layer of modified EVA that could be subjected to an additional lamination step.

An EAA weatherable layer was separately extruded onto a polyester carrier as follows: Clear EAA copolymer (PRIMACOR 3440) was mixed with 4-weight percent of a gray color concentrate containing 40 weight percent TiO2 and 5 weight percent carbon black in polyethylene (obtained from Ampacet Corporation, Tarrytown N.Y. under the trade designation SPECTRATECH CM22160) and extruded onto the polyester to produce a 0.1 mm thick layer of the gray EAA weatherable layer.

In a second lamination step, the gray EAA weatherable layer was thermally bonded to the exposed modified EVA layer of the laminated assembly produced in the first lamination step. The lamination equipment, line speed, temperature and nip force or pressure were similar to those used in the first lamination step. For this second lamination step, the polyester carrier for the gray EAA weatherable layer was placed against the metal hot can surface and the transparent polyurethane overlay of the laminated assembly was placed against the rubber roll. Following completion of the second lamination step, the polyester carrier was stripped from the gray EAA side of the final laminated assembly.

The resulting roll-up sign material had excellent bonding between all layers and was resistant to delamination. The scrim pattern was minimally visible from the retroreflective viewing side of the sign material. Flexibility was measured by wrapping the sign around a cylindrical mandrel having a 3.2 mm diameter. The test was performed at 0° C. with good results and no visible cracking.

Comparative Example B

The same conditions as recited in Example 10 were used except as follows:

A 0.12 mm thick gray weatherable layer of EAA was extruded onto the PET carrier. In a first lamination step, the weatherable layer of EAA was laminated to the scrim using a line speed of 3 meters/minute, a lamination temperature of 122° C., and a nip force or pressure of 180 newtons/cm. The single layer film in the backing member thus formed did not have a core layer or a primed polyurethane layer. In a second lamination step for bonding the retroreflective article to the backing member, the line speed was 1.5 meters/minute, the lamination temperature was 122° C., and the nip force or pressure was 180 newtons/cm. The resulting retroreflective article had poor bonding between the backing member and the retroreflective member. The EAA weatherable layer of the backing member did not bond well to the polyurethane sealing member of the retroreflective article. When the nip force or pressure in the second lamination step was increased to 600 newtons/cm, the same result of poor bonding was observed in the retroreflective article. The absence of the inventive multilayer films resulted in unacceptably low lamination strength.

Example 11

Roll-Up Sign Having a Multilayer Film Backing Layer and a Scrim—3-Step Lamination A roll-up sign was prepared using the materials of Example 10 and three lamination steps. In the first lamination step, the multilayer backing member was laminated to the scrim. The lamination equipment, line speed, temperature and nip force or pressure were like those used in Example 10. The PET carrier for the multilayer backing member was placed against the metal hot can roll, and the scrim was placed against the rubber roll. During lamination, the urethane primer layer of the multilayer backing member flowed into openings between the strands of the scrim.

In the second lamination step, the retroreflective sheeting was thermally laminated to the urethane primer layer of the laminated assembly formed in the first lamination step. The lamination equipment, line speed, temperature and nip force or pressure were like those used in the first lamination step. The PET carrier of the laminated assembly was placed against the metal hot can roll and the transparent polyurethane overlay for the retroreflective sheeting was placed against the rubber roll.

In the third lamination step, the grey EAA weatherable layer was thermally laminated onto the laminated assembly formed in the second lamination step. The lamination equipment, line speed and nip force or pressure were like those used in the first and second lamination steps, and the lamination temperature was 127° C. The polyester carrier for the gray EAA weatherable layer was placed against the metal hot can surface and the transparent polyurethane overlay of the laminated assembly was placed against the rubber roll.

The resulting roll-up sign material had excellent bonding between all layers and was resistant to delamination. Flexibility was measured by wrapping the sign material around a cylindrical mandrel having a 3.2 mm diameter. The test was performed at 0° C. with good results and no visible cracking.

Example 12

Roll-Up Sign Having a Multilayer Film Backing Layer and a Scrim—3-Step Lamination A roll-up sign was prepared using the materials of Example 10 and three lamination steps. In the first lamination step, the multilayer backing member was laminated to the scrim as in the first lamination step of Example 11. The PET carrier was removed from the multilayer backing member side of the resulting laminated assembly, thereby exposing a layer of modified EVA that could be subjected to the second lamination step.

In the second lamination step, the grey EAA weatherable layer was thermally laminated onto the layer of modified EVA. The lamination equipment, line speed, temperature and nip force or pressure were like those used in Example 10. The polyester carrier for the gray EAA weatherable layer was placed against the metal hot can surface and the scrim side of the laminated assembly was placed against the rubber roll.

In the third lamination step, the retroreflective sheeting was thermally laminated to the urethane primer layer of the laminated assembly formed in the second lamination step. The lamination equipment, line speed, temperature and nip force or pressure were like those used in the third lamination step of Example 11. The PET carrier for the weatherable layer was placed against the metal hot can roll and the transparent polyurethane overlay for the retroreflective sheeting was placed against the rubber roll.

The resulting roll-up sign material had excellent bonding between all layers and was resistant to delamination. Flexibility was measured by wrapping the sign material around a cylindrical mandrel having a 3.2 mm diameter. The test was performed at 0° C. with good results and no visible cracking.

Example 13

Exposed Lens Retroreflective Article with a Multilayer Film Substrate

Various samples of exposed lens retroreflective articles were made having a construction the same as or similar to the article shown in FIG. 14. The retroreflective member 452 was a portion of a conventional exposed lens sheeting available from 3M under the designation Scotchlite™ Reflective Material 8710 Silver Transfer Film. The conventional 8710 product typically has a removable paper liner attached to front surface 460; glass beads 456 having a refractive index of about 1.9 and a diameter of about 0.06 mm; an aluminum reflective coating 458; a bead bond layer 466 about 0.09 mm thick and composed of ABS cured with phenolic; a 0.025 mm thick layer of polyurethane adhesive contacting the back of bead bond layer 466; and a removable liner about 0.05 mm thick and composed of polyethylene, contacting the back of the polyurethane adhesive layer. (Under current practices, converting operators laminate such 8710 sheeting, after removing the polyethylene liner, to a relatively thick substrate of PVC for mechanical integrity, the resulting product then being useable in athletic shoes and other end-use applications.) For purposes of this example, a first type of retroreflective member 452 was provided by omitting the polyurethane adhesive layer and the polyethylene liner from the conventional 8710 product. A second type of retroreflective member 452 was provided by omitting only the polyethylene liner from the conventional 8710 product.

Each of these two retroreflective members was then heat laminated to six different multilayer films 454. Each of the six films 454 had a trilayer construction, having a first urethane layer 454a, a core layer 454b of an alkylene copolymer, and a second urethane layer 454c. The layers 454a–c were made by coextrusion onto a 0.05 mm thick PET carrier. Layers 454a and 454c were composed of a polyurethane available from Rohm and Haas under the trade designation MORTHANE L430.77. If desired, layers 454a and 454c can comprise different polyurethane compositions tailored for optimum performance. Layer 454b was composed of anhydride-modified EVA (BYNEL 3860). The various films 454 (labeled 454-1 through 454-6) differed by the thicknesses used for each of the layers, as follows:

| Film Designation | Approximate Thickness (mm) | | |
| --- | --- | --- | --- |
| | Layer 454a | Layer 454b | Layer 454c |
| 454-1 | 0.005 | 0.13 | 0.005 |
| 454-2 | 0.01 | 0.13 | 0.01 |
| 454-3 | 0.005 | 0.25 | 0.005 |
| 454-4 | 0.01 | 0.25 | 0.01 |
| 454-5 | 0.005 | 0.43 | 0.005 |
| 454-6 | 0.01 | 0.43 | 0.01 |

During lamination, the removable PET layer (item 464 in FIG. 14) remained attached to multilayer film 454, and the conventional removable paper liner remained attached to front surface 460 of the retroreflective layer 452. Lamination was performed using a rolling nip laminator at a line speed of 3 meters/minute, temperature of about 120° C. and nip force or pressure of about 300 newtons/cm.

In each case, the multilayer film 454 was found to be a suitable replacement for the single PVC substrate used currently with exposed lens retroreflective sheetings. The multilayer films 454 were found to exhibit the desired surface properties of polyurethane while incorporating the bulk properties of an EVA film. In particular, films 454 had good adhesion to retroreflective members 452 after lamination, and also showed good adhesion to fabrics at the back surface 462. A bulk polyurethane film would be more costly, while a bulk EVA film would not have the desired surface properties. For reduced cost with little to no performance penalty, the thickness of either layer 454a, 454c is desirably about 10% or less of the overall thickness of the multilayer film 454.

The samples made in this example can be heat laminated, radio frequency (RF) or ultrasonically welded, or otherwise applied to additional fabrics or films at the back surface 462. The PET layer 464 is removed prior to such lamination. The paper liner is removed from the front surface 460 to expose the retroreflective elements.

The complete disclosure of all patents, patent documents, and publications are incorporated herein by reference as if individually incorporated. Various modifications and alterations of this invention will become apparent to those skilled in the art without departing from the scope and spirit of this invention.

What is claimed is:

1. A retroreflective article, comprising:
 a plurality of retroreflective elements; and
 a substantially continuous, substantially contiguous multilayer film having at least one layer of a thermoplastic urethane polymer, and a core layer of a copolymer of alkylene and at least one non-acidic, polar co-monomer wherein delamination of the urethane polymer layer and core layer is not found using an X-cut tape test.

2. The article of claim 1, wherein the retroreflective elements comprise transparent beads placed in a cooperative position with respect to a reflective coating to form a retroreflective member.

3. The article of claim 2, wherein the article comprises an enclosed lens retroreflective sheeting having a face member that comprises the multilayer film.

4. The article of claim 2, wherein the article comprises an encapsulated lens retroreflective sheeting having a face member that comprises the multilayer film.

5. The article of claim 2, wherein the beads comprise an air-exposed portion.

6. The article of claim 5, wherein the beads also comprise a hemispherical portion having a reflective coating thereon and the multilayer film comprises a bead bond layer that carries a plurality of the beads.

7. The article of claim 6, wherein the plurality of retroreflective elements are held in a bead bond layer, and the multilayer film is disposed proximate the bead bond layer.

8. The article of claim 7, wherein the layer of a urethane polymer has a thickness no more than 10% of the overall thickness of the multilayer film.

9. The article of claim 1, wherein the retroreflective elements comprise microstructured prism elements.

10. The article of claim 9, further comprising:
    a face member having a first major viewing surface;
    a retroreflective member having a first major surface with the face member thereon and an opposing second major microstructured surface comprising the prism elements; and
    a sealing member bonded to portions of the retroreflective member to form a pattern of seal legs and encapsulated air cells, with the retroreflective member in spaced relation to the sealing member and the prism elements having an air exposed portion within the cells, wherein at least one of the face member and sealing member comprises the multilayer film.

11. The article of claim 9, wherein the retroreflective elements are provided in a retroreflective member having a pattern of raised ridges on a microstructured surface of the retroreflective member; and wherein a sealing member is bonded to the raised ridges of the retroreflective member and comprises the multilayer film.

12. The article of claim 11, wherein the article comprises a polymeric substrate.

13. The article of claim 1, wherein the copolymer is an ethylene copolymer that comprises between 55 and 95 weight percent ethylene.

14. The article of claim 13, wherein the ethylene copolymer has a melt index between 0.8 and 800 dg/min. when tested according to ASTM D1238 at 190° C. and with an 8.7 Kg weight.

15. The article of claim 1, wherein the copolymer is an ethylene copolymer that comprises between 5 and 40 weight percent non-acidic co-monomer.

16. The article of claim 1, wherein the copolymer comprises less than about 10 weight percent acidic or anhydride co-monomer.

17. The article of claim 1, wherein the copolymer is formed from ethylene and at least one non-acidic co-monomer selected from at least one of vinyl acetate, acrylate, and carbon monoxide.

18. The article of claim 1, wherein the copolymer is selected from at least one of EVA, acid-modified EVA, anhydride-modified EVA, acid-acrylate-modified EVA, anhydride-acrylate-modified EVA, EEA, EMA, AEA, EVACO, EBACO, and EnBA.

19. The article of claim 1, wherein the copolymer is selected from at least one of EVA and modified EVA, and wherein the vinyl acetate content is between 7 and 40 weight percent.

20. The article of claim 1, wherein the thickness of the layer of a urethane polymer comprises less than 50% of the combined thickness of the multilayer film.

21. The article of claim 1, wherein the thickness of the layer of a urethane polymer comprises less than 30% of the combined thickness of the multilayer film.

22. The article of claim 1, wherein the multilayer film consists essentially of 3 to 7 layers.

23. The article of claim 1, wherein the multilayer film consists of 3 layers.

24. The article of claim 1, wherein the multilayer film further comprises a third layer of a polymer selected from at least one of urethane polymers, EAA, EMAA and ionomer resins.

25. The article of claim 1, wherein a layer comprising a blend of a polyurethane and an alkylene copolymer is provided between the layer of a urethane polymer and the core layer of copolymer.

26. The article of claim 1, wherein the multilayer film is produced by co-extruing the layer of a urethane polymer and the core layer of copolymer.

27. The article of claim 1, further comprising:
    a face member;
    a sealing member; and
    a backing member having a scrim comprising a plurality of multifilament strands, wherein at least one of the face member, sealing member and backing member comprises the multilayer film.

28. The article of claim 27, wherein the article is sufficiently flexible to conform to a 3.2 mm diameter mandrel at 0° C. without visibly cracking.

29. The article of claim 27, wherein the article has a major viewing surface on the face member side of the article and a scrim pattern cannot be seen through the viewing surface.

30. The article of claim 1, wherein the article is selected from at least one of a road sign, a roll-up sign, a license plate, vehicle conspicuity sheeting, an article of clothing, footwear, an accessory bag, a backpack, a protective cover, a sheet, a tarpaulin, a warning tape, a pavement marking article, a decorative webbing, a structural webbing, and a tape, piping, emblem or patch for attachment to such an article.

* * * * *

UNITED STATES PATENT AND TRADEMARK OFFICE
CERTIFICATE OF CORRECTION

PATENT NO. : 6,677,028 B1
DATED : January 13, 2004
INVENTOR(S) : Lasch, James E.

It is certified that error appears in the above-identified patent and that said Letters Patent is hereby corrected as shown below:

Column 8,
Line 61, "HP66 1" should be -- HP661, --.

Column 9,
Lines 50-51, should not be a new paragraph.

Column 10,
Line 66, "polymer, illustrative" should be -- polymer. Illustrative --.

Column 32,
Line 31, "co-extruing" should be -- co-extruding --.

Signed and Sealed this

Twentieth Day of April, 2004

JON W. DUDAS
*Acting Director of the United States Patent and Trademark Office*